(12) United States Patent
Ling et al.

(10) Patent No.: US 12,293,532 B2
(45) Date of Patent: May 6, 2025

(54) IMAGE PROCESSING METHOD, APPARATUS, AND DEVICE, PATH PLANNING METHOD, APPARATUS, AND DEVICE, AND STORAGE MEDIUM

(71) Applicant: Tencent Technology (Shenzhen) Company Limited, Guangdong (CN)

(72) Inventors: Yonggen Ling, Guangdong (CN); Wanchao Chi, Guangdong (CN); Chong Zhang, Guangdong (CN); Shenghao Zhang, Guangdong (CN); Zhengyou Zhang, Guangdong (CN); Zejian Yuan, Guangdong (CN); Ang Li, Guangdong (CN); Zidong Cao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 418 days.

(21) Appl. No.: 17/680,515

(22) Filed: Feb. 25, 2022

(65) Prior Publication Data

US 2022/0180543 A1 Jun. 9, 2022

Related U.S. Application Data

(63) Continuation of application No. PCT/CN2020/128292, filed on Nov. 12, 2020.

(30) Foreign Application Priority Data

Mar. 4, 2020 (CN) .......................... 202010141219.9

(51) Int. Cl.
*G06T 7/55* (2017.01)
*G05D 1/00* (2024.01)
(Continued)

(52) U.S. Cl.
CPC ............. *G06T 7/55* (2017.01); *G05D 1/0248* (2013.01); *G06T 3/40* (2013.01); *G06T 7/521* (2017.01);
(Continued)

(58) Field of Classification Search
CPC ... G06T 7/55; G06T 3/40; G06T 2207/20016; G06T 2207/20081; G06T 2207/20084; G06T 2207/20221
See application file for complete search history.

(56) References Cited

U.S. PATENT DOCUMENTS 10,474,161 B2 * 11/2019 Huang ................... G06V 20/56
11,055,866 B2 * 7/2021 El-Khamy ........... H04N 13/243
(Continued)

FOREIGN PATENT DOCUMENTS

CN 103136775 A 6/2013
CN 106780588 A 5/2017
(Continued)

OTHER PUBLICATIONS

Li, Z. Yuan, Y. Ling, W. Chi, S. Zhang and C. Zhang, "A Multi-Scale Guided Cascade Hourglass Network for Depth Completion," 2020 IEEE Winter Conference on Applications of Computer Vision (WACV), Snowmass, CO, USA, 2020, pp. 32-40, Date of conference Mar. 1-5, 2020. (Year: 2020).*
(Continued)

*Primary Examiner* — Michael Robert Cammarata
(74) *Attorney, Agent, or Firm* — ArentFox Schiff LLP

(57) ABSTRACT

A method of depth map completion is described. A color map and a sparse depth map of a target scenario can be received. Resolutions of the color map and the sparse depth map are adjusted to generate n pairs of color maps and sparse depth maps of n different resolutions. The n pairs of color maps and the sparse depth maps can be processed to
(Continued)

generate n prediction result maps using a cascade hourglass network including n levels of hourglass networks. Each of the n pair is input to a respective one of the n levels to generate the respective one of the n prediction result maps. The n prediction result maps each include a dense depth map of the same resolution as the corresponding pair. A final dense depth map of the target scenario can be generated according to the dense depth maps.

20 Claims, 9 Drawing Sheets

(51) Int. Cl.
*G06T 3/40* (2024.01)
*G06T 7/521* (2017.01)
(52) U.S. Cl.
CPC .............. *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/20221* (2013.01); *G06T 2207/30252* (2013.01)

(56) References Cited

U.S. PATENT DOCUMENTS

| | | | |
|---|---|---|---|
| 2017/0272724 | A1 | 9/2017 | Lim |
| 2020/0265597 | A1* | 8/2020 | Ye .......................... G06N 3/045 |
| 2020/0273190 | A1* | 8/2020 | Ye .......................... G06T 7/579 |
| 2020/0273192 | A1* | 8/2020 | Cheng ................... G06V 10/454 |
| 2021/0103763 | A1* | 4/2021 | Fan ........................ G01S 17/89 |
| 2022/0335583 | A1* | 10/2022 | Xuan ....................... G06T 5/90 |

FOREIGN PATENT DOCUMENTS

| | | | | |
|---|---|---|---|---|
| CN | 106951875 | A | | 7/2017 |
| CN | 106097429 | B | | 11/2017 |
| CN | 109087349 | A | | 12/2018 |
| CN | 109325972 | A | | 2/2019 |
| CN | 189685842 | A | | 4/2019 |
| CN | 109903372 | A | * | 6/2019 |
| CN | 110459301 | A | | 11/2019 |
| CN | 110476185 | A | | 11/2019 |
| CN | 110599533 | A | | 12/2019 |
| CN | 110992271 | A | | 4/2020 |
| WO | WO-2024077909 | A1 | * | 4/2024 |

OTHER PUBLICATIONS

Ma, Fangchang, and Sertac Karaman. "Sparse-to-dense: Depth prediction from sparse depth samples and a single image." 2018 IEEE international conference on robotics and automation (ICRA). IEEE, 2018. (Year: 2018).*

S. Ioffe and C. Szegedy, "Batch normalization: Accelerating deep network training by reducing internal covariate shift," in International conference on machine learning, 2015, pp. 448-456. (Year: 2015).*

Z. Huang, J. Fan, S. Cheng, S. Yi, X. Wang and H. Li, "HMS-Net: Hierarchical Multi-Scale Sparsity-Invariant Network for Sparse Depth Completion," in IEEE Transactions on Image Processing, vol. 29, pp. 3429-3441, 2020, doi: 10.1109/TIP.2019.2960589. (Year: 2019).*

F. Ma, G. V. Cavalheiro and S. Karaman, "Self-Supervised Sparse-to-Dense: Self-Supervised Depth Completion from LiDAR and Monocular Camera," 2019 International Conference on Robotics and Automation (ICRA), Montreal, QC, Canada, 2019, pp. 3288-3295, doi: 10.1109/ICRA.2019.8793637 (Year: 2019).*

WACV 2020 Pocket Guide to the 2020 IEEE Winter Conference on Applications of Computer Vision (WACV), Snowmass, CO, USA, 2020, pp. 1-28, Date of conference Mar. 1-5, 2020.*

Li, Z. Yuan, et al., "A Multi-Scale Guided Cascade Hourglass Network for Depth Completion," 2020 IEEE Winter Conference on Applications of Computer Vision (WACV), Snowmass, CO, USA, 2020, pp. 1-90, WAVC 2020 Open Access version published by the Computer Vision Foundation Mar. 1, 2024 (Year: 2020).*

Zhang, Lei, et al. "S&CNet: monocular depth completion for autonomous systems and 3D reconstruction." arXiv preprint arXiv:1907.06071 (2019). (Year: 2019).*

X. Cheng, P. Wang and R. Yang, "Learning Depth with Convolutional Spatial Propagation Network," in IEEE Transactions on Pattern Analysis and Machine Intelligence, vol. 42, No. 10, pp. 2361-2379, Oct. 1, 2020, doi: 10.1109/TPAMI.2019.2947374 (Year: 2019).*

International Search Report and Written Opinion issued Feb. 18, 2021 in International Application No. PCT/CN2020/128292 with English translation, 10 pgs.

Chinese Office Action issued Apr. 21, 2020 In Chinese Application No. 202010141219.9 with English translation, 13 pgs.

Haojie Ma, Monocular Depth Estimation and Depth Completion based on Convolutional Neural Network, 3 pgs.

Geiger, Andreas, Philip Lenz, and Raquel Urtasun. "Are we ready for autonomous driving? the kitti vision benchmark suite." 2012 IEEE conference on computer vision and pattern recognition. IEEE, 2012.

Qiu, Jiaxiong, et al. "Deeplidar: Deep surface normal guided depth prediction for outdoor scene from sparse lidar data and single color image." Proceedings of the IEEE/CVF Conference on Computer Vision and Pattern Recognition. 2019.

Van Gansbeke, Wouter, et al. "Sparse and noisy lidar completion with rgb guidance and uncertainty." 2019 16th International conference on machine vision applications (MVA). IEEE, 2019.

Ma, Fangchang, Guilherme Venturelli Cavalheiro, and Sertac Karaman. "Self-supervised sparse-to-dense: Self-supervised depth completion from lidar and monocular camera." 2019 International Conference on Robotics and Automation (ICRA). IEEE, 2019.

Eldesokey, Abdelrahman, Michael Felsberg, and Fahad Shahbaz Khan. "Confidence propagation through cnns for guided sparse depth regression." IEEE transactions on pattern analysis and machine intelligence 42.10 (2019): 2423-2436.

Jaritz, Maximilian, et al. "Sparse and dense data with cnns: Depth completion and semantic segmentation." 2018 International Conference on 3D Vision (3DV). IEEE, 2018.

* cited by examiner

IMAGE PROCESSING METHOD, APPARATUS, AND DEVICE, PATH PLANNING METHOD, APPARATUS, AND DEVICE, AND STORAGE MEDIUM

RELATED APPLICATION

This application is a continuation of International Patent application No. PCT/CN2020/128292, filed on Nov. 12, 2020, which claims priority to Chinese Patent Application No. 202010141219.9, filed on Mar. 4, 2020. The disclosures of the prior applications are hereby incorporated by reference in their entirety.

FIELD OF THE TECHNOLOGY

This application relates to the field of artificial intelligence and computer vision technologies, including an image processing method, apparatus, and device, a path planning method, apparatus, and device, and a storage medium.

BACKGROUND OF THE DISCLOSURE

Depth perception is an important part of many computer vision tasks, such as automatic navigation and augmented reality. A common depth perception method is based on a high-precision depth sensor. However, a commodity-level sensor can generate a sparse depth map, and cannot meet a high-level application requirement, such as path planning and obstacle avoidance.

SUMMARY

Aspects of the disclosure can provide a method of depth map completion. A color map and a sparse depth map that are corresponding to a target scenario can be received. Resolutions of the color map and the sparse depth map are adjusted to generate n pairs of color maps and sparse depth maps of n different resolutions. Each pair can include one color map and one sparse depth map of the same respective resolution, n can be a positive integer greater than 1. The n pairs of color maps and the sparse depth maps can be processed to generate n prediction result maps using a cascade hourglass network including n levels of hourglass networks cascaded together. Each of the n pair is input to a respective one of the n levels to generate the respective one of the n prediction result maps. The n prediction result maps each include a dense depth map of the same resolution as the corresponding pair. A final dense depth map corresponding 10 the target scenario can be generated according to the dense depth maps of the n prediction result maps.

Aspects of the disclosure can provide an apparatus for information processing. The apparatus can include processing circuitry configured to receive a color map and a sparse depth map that are corresponding to a target scenario. Resolutions of the color map and the sparse depth map are adjusted to generate n pairs of color maps and sparse depth maps of n different resolutions. Each pair can include one color map and one sparse depth map of the same respective resolution, n can be a positive integer greater than 1. The n pairs of color maps and the sparse depth maps can be processed to generate n prediction result maps using a cascade hourglass network including n levels of hourglass networks cascaded together. Each of the n pair is input to a respective one of the n levels to generate the respective one of the n prediction result maps. The n prediction result maps each include a dense depth map of the same resolution as the corresponding pair. A final dense depth map corresponding to the target scenario can be generated according to the dense depth maps of the n prediction result maps.

Aspects of the disclosure can provide a non-transitory computer-readable storage medium storing instructions, which when executed by at least one processor, cause the at least one processor to perform the method of depth map completion.

The techniques disclosed herein may bring the following beneficial effects. A color map and a sparse depth map corresponding to a target scenario are obtained, then resolutions of the color map and the sparse depth map are adjusted to obtain color maps and sparse depth maps in multiple types of resolutions (having different resolutions), and a cascade hourglass network is invoked to process the color maps and the sparse depth maps in the multiple types of resolutions to obtain prediction result maps in the multiple types of resolutions. A prediction result map in each resolution includes a dense depth map in the respective resolution. A computer device may generate, according to the dense depth maps in the multiple types of resolutions, a final dense depth map corresponding to the target scenario, thereby providing a manner of generating a dense depth map by filling in pixels in a sparse depth map, that is, providing a depth completion manner.

In addition, in the embodiments of this application, because different features of an object in the target scenario are highlighted by using color maps and sparse depth maps in different resolutions, the color maps and the sparse depth maps in different resolutions are inputted to each level of the hourglass network, so that the different features of the object in the target scenario can be emphatically predicted or captured. Compared with a solution of extracting and predicting all features of the object in the target scenario from each level of hourglass network, which causes a large operation amount of the cascade hourglass network, and different types of features of the predated object fail to be extracted and predicted differently. In the embodiments of this application, different extraction and prediction manners are used for different features of the object in the target scenario in the cascade hourglass network, and different portion of the features of the object in the target scenario are specially predicted with different portions of each level of hourglass network. While reducing processing overheads of the computer device and the operation amount of the hourglass network, the different features of the object in the target scenario can be captured and predicted, so that a depth completion result, that is, the final dense depth map corresponding to the target scenario, is more accurate.

BRIEF DESCRIPTION OF THE DRAWINGS

To describe the technical solutions in embodiments of this application more clearly, the following briefly describes the accompanying drawings for describing the embodiments. The accompanying drawings in the following description show merely some embodiments of this application, and a person of ordinary skill in the art may still derive other drawings from these accompanying drawings.

DESCRIPTION OF EMBODIMENTS

Figure 1:
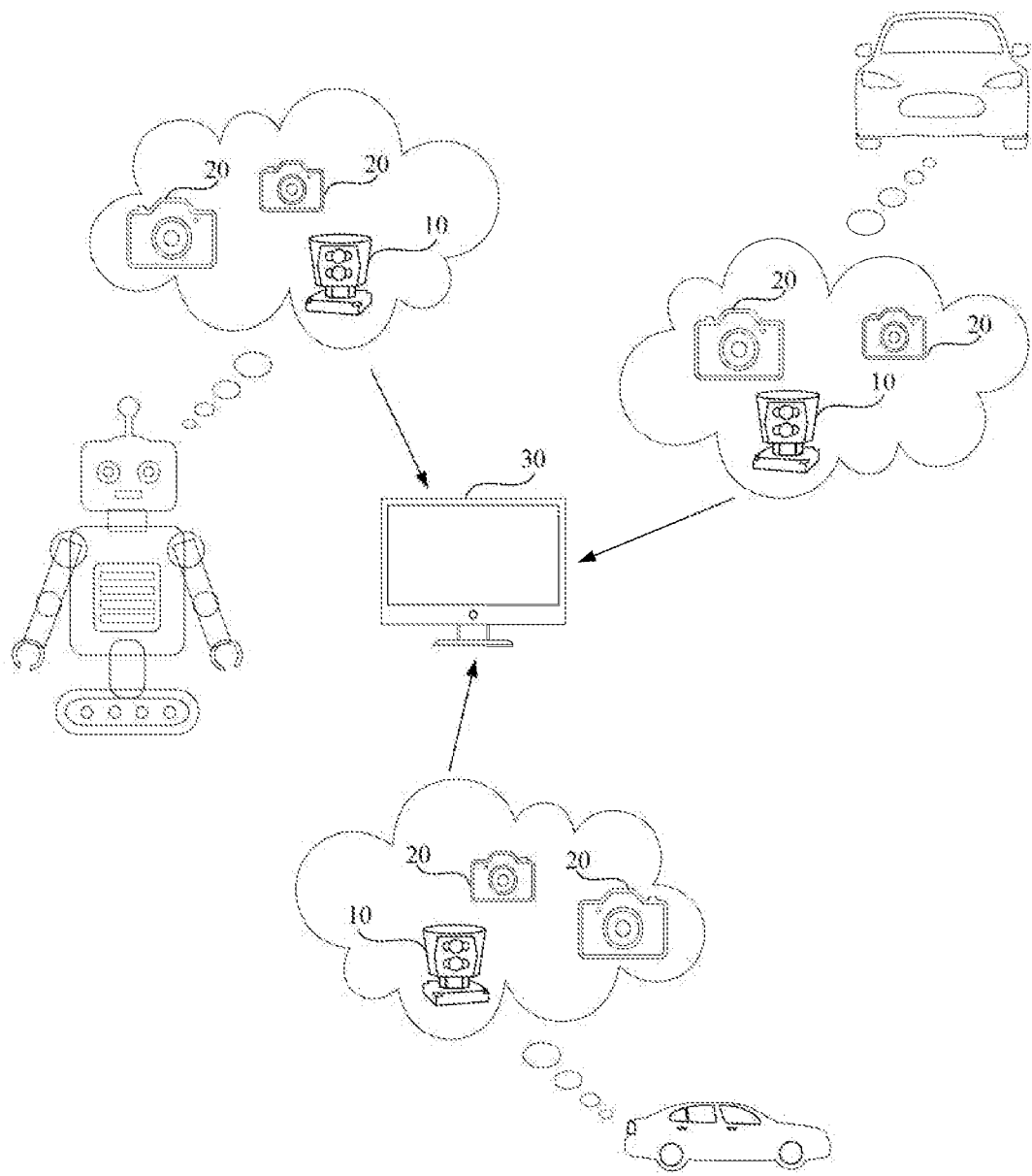
FIG. 1 is a schematic diagram of an implementation environment according to an embodiment of this application.

To make the objectives, technical solutions, and advantages of this application clearer, the following further describes the implementations of this application in detail with reference to the accompanying drawings.

In some examples, a quantity of effective points in a sparse depth map is increased by using depth completion to generate a dense depth map. Depth completion is mainly completed by using an hourglass network, and a sparse depth map is inputted into the hourglass network to output a dense depth map. The hourglass network may be divided into a contraction part and an expansion part. The contraction part extracts multiple features of a sparse depth map by using a series of downsampling convolution, and the expansion part gradually receives these features from the contraction part, so as to obtain a dense depth map corresponding to a resolution of the sparse depth map. However, depth completion for a sparse depth map is that all features in a red green blue (RGB) image corresponding to the sparse depth map are extracted in the same manner, a network structure used is single, and mining of depth information is lacked.

Artificial intelligence (AI) can be a theory, a method, a technology, or an application system in which a digital computer or a machine controlled by a digital computer is used to simulate, extend, and expand human intelligence, sense an environment, acquire knowledge, and use the knowledge to obtain an optimal result. In other words, the AI is a comprehensive technology of computer science, which attempts to understand essence of intelligence and produces a new intelligent machine that can respond in a manner similar to human intelligence. In AI, the design principles and implementation methods of various intelligent machines are studied to enable the machines to have the capabilities of perception, reasoning, and decision-making.

The AI technology is a comprehensive discipline, covering a wide range of fields including both a hardware-level technology and a software-level technology. The AI technologies generally can be applied to a sensor, a dedicated AI chip, cloud computing, distributed storage, a big data processing technology, an operation/interaction system, or mechatronics. AI software technologies mainly can include fields such as a computer vision technology, a speech processing technology, a natural language processing technology, and machine learning (ML)/deep learning (DL).

The computer vision (CV) technology has been developed to solve the issue of how to use a machine to "see", and furthermore, how to use a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, computer vision studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

With the development of the AI technology, the AI technology can be applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The technical solutions provided in the embodiments of this application are related to the CV technologies and are specifically described by using the embodiments.

FIG. 1 is a schematic diagram of an implementation environment according to an embodiment of this application. The implementation environment includes a laser radar(s) 10, a camera(s) 20, and a computer device 30.

The laser radar 10 is an active remote sensing device that uses a laser as a light emitting source and uses a photoelectric detection technology, to detect a characteristic quantity such as a position and a speed of a target object by emitting a laser beam. In some embodiments, the laser radar 10 is mounted with a light detection and ranging (LiDAR) for the purpose of detection. In an example, the laser radar 10 acquires radar point cloud data by scanning, that is, emitting a laser beam, and the radar point cloud data has a three-dimensional characteristic. In some embodiments, mapping the radar point cloud data to a two-dimensional plane may generate a depth map, and a value of each pixel in the depth map represents a distance from the point to the laser radar 10. The laser radar 10 may also be implemented as (or replaced with) another type of sensor to generate a depth map in various embodiments.

The camera 20 is a device configured to collect an image of a scenario. For example, the camera 20 is a color camera, and is configured to collect an RGB image corresponding to a scenario. The RGB image may have a relatively high or low resolution.

In an example, the laser radar 10 and the camera 20 may be mounted on the same mobile apparatus (which may also be referred to as a mobile platform) that has a high-level application associated, for example, mounted on a mobile robot or an unmanned vehicle. In other embodiments, one laser radar 10 and one camera 20 are mounted on a mobile apparatus, or multiple laser radars 10 and multiple cameras 20 are mounted on the mobile apparatus. This disclosure imposes no limitation on a quantity of the laser radar 10 and the camera 20 that are mounted on the mobile apparatus. In some examples, the quantity may be specifically determined with reference to a movement range and a precision configuration of the mobile apparatus. For example, the laser radar 10 mounted in the mobile apparatus may detect an object in the target scenario to acquire radar point cloud data, and generate a depth map according to the radar point cloud data. Because a resolution of the laser radar 10 is relatively low in some examples, a small quantity of point cloud data can be acquired, that is a quantity of pixels is relatively small, and therefore, the depth map is relatively sparse, which is usually referred to as a sparse depth map. In some examples, a dense depth map may be generated. The camera 20 in the mobile apparatus may collect an image of the target scenario to acquire an RGB image of the target scenario. In an example, the RGB image may display the target scenario at a relatively high resolution, provide high resolution optical description of the target scenario, and cannot be used for directly acquiring depth data of the target scenario. Based on this, the disclosure provides an image processing method. The image processing method may be applied to a computer device 30 by complementing a sparse depth map into a dense depth map with reference to an RGB image (with a high or low resolution). The image processing method can also be applied to a dense depth map to obtain a denser depth map.

The computer device 30 refers to a device that has an image processing and data analysis capability, such as a personal computer (PC) and or a server that have a data storage capability and/or a data processing capability, or may be a terminal such as a mobile phone, a tablet computer, a multimedia playback device, or a wearable device, or may be another computer device. This is not limited in this disclosure. Optionally, when the computer device 30 is a server, the computer device 30 may be one server, a server cluster including multiple servers, or one cloud computing service center.

The computer device 30 can be configured with an hourglass network, and the hourglass network may process a sparse depth map and an RGB image. In some embodiments, the hourglass network is a cascade hourglass network. In this disclosure, a number of levels of the cascade hourglass network is not limited. In some examples, the computer device 30 is independent from a mobile apparatus, or the computer device 30 is implemented as a computing processing apparatus or the like and is mounted in the mobile apparatus. It is to be understood that, for ease of description, the computer device 30 and the mobile apparatus being separate is merely used as an example for description in FIG. 1, but this does not constitute a limitation on a relationship between the computer device 30 and the mobile apparatus.

In an example, the computer device 30 and the laser radar 10, and the computer device 30 and the camera 20 communicate with each other by using a network(s). Optionally, an apparatus with a data storage and collection function may be disposed in the mobile apparatus mounted with the laser radar 10 and the camera 20. The apparatus may be implemented as a computer device, may be implemented as a storage medium, or may be implemented as a chip. This is not limited in this disclosure. Further, the apparatus may separately obtain data from the laser radar 10 and the camera 20, and then communicate with the computer device 30 by using a network. For example, the network is a wired network or a wireless network. In an example, the computer device acquires a sparse depth map corresponding to a target scenario from the laser radar 10, acquires an RGB image corresponding to the target scenario from the camera 20, and then invokes a cascade hourglass network, and complements (or complete) the sparse depth map to a dense depth map corresponding to the target scenario under guidance of the RGB image.

Figure 2:
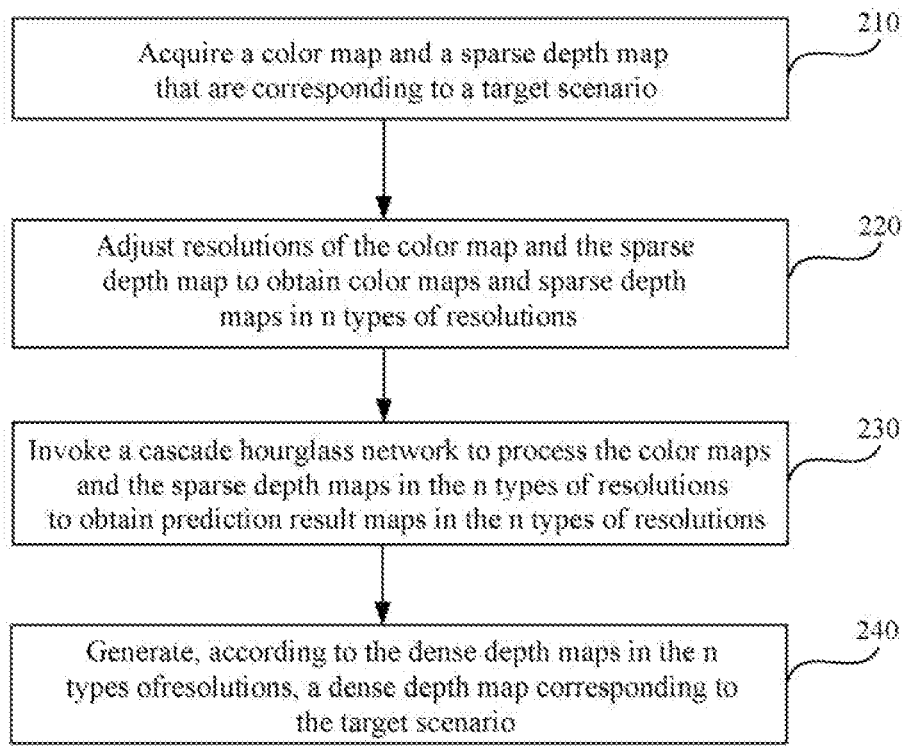
FIG. 2 is a flowchart of an image processing method according to an embodiment of this application.

FIG. 2 is a flowchart of an image processing method according to an embodiment of this application. The method may be applied to the computer device described above. The method may include the following steps.

In Step 210, a color map and a sparse depth map that are corresponding to a target scenario can be obtained.

The target scenario is a scenario corresponding to an environment in which a mobile apparatus is located. The mobile apparatus refers to a platform that can move actively or passively, for example, an intelligent robot, an unmanned vehicle, or an unmanned aircraft. A type and a movement manner of the mobile apparatus are not limited in this disclosure.

An image collection device is positioned in the target scenario, and the image collection device collects a color map and a sparse depth map that are corresponding to the target scenario. Alternatively, the mobile apparatus is mounted with an image collection device or an image collection apparatus, such as a laser radar or a camera, to collect an image of the target scenario. A specific mounting manner of the image collection device or the image collection apparatus is not limited in this disclosure. For example, the mobile apparatus is mourned with a color camera and a laser radar. The color camera may photograph the target scenario to form a color map corresponding to the target scenario. The color map may be an RGB picture, or may be a grayscale picture or a gray scale picture. The color map may be referred to as a color image in some examples. A type of the color map is not limited in this disclosure. An object in the target scenario is probed by using the laser radar to acquire radar point cloud data corresponding to the target scenario.

To reduce processing overheads and improve an operation speed of the computer device, a two-dimensional image can be used in a process of executing an example of the method in this application. Therefore, in an embodiment, the computer device may convert a three-dimensional image or three-dimensional data into a two-dimensional image or two-dimensional data. For example, the color camera collects an RGB image corresponding to the target scenario. The computer device may convert the RGB image into a grayscale map, so as to ignore color information of the target scenario, reduce unnecessary information amount, and reduce processing overheads. For example, the laser radar collects radar point cloud data, and the computer device may further generate a depth map according to the radar point cloud data. In an example, the depth map is a sparse depth map, that is, a depth map with a number of pixels less than a preset quantity. The disclosure sets no limitation on a sequence of processing the RGB image and the radar point cloud data. The RGB image and the radar point cloud data may be processed simultaneously, the RGB image may be processed before the radar point cloud data is processed, or the radar point cloud data may be processed before the RGB image is processed.

In an example, an example that the color map is a grayscale image is used for description, and the color map may be alternatively implemented as an RGB image or other types of image. This is not limited in this disclosure.

In an example, in addition to the color camera and the laser radar, the mobile apparatus may further be mounted with an apparatus with a data collection and storage function. The apparatus may be implemented as a chip, a storage medium, a computer device, or the like. The apparatus can acquire the RGB image collected by the color camera and the radar point cloud data collected by the laser radar, generate a grayscale image according to the RGB image, generate a sparse depth map according to the radar point cloud data, and send the processed grayscale image and sparse depth map to the computer device used for image processing in this embodiment of this application.

In Step 220, resolutions of the color map and the sparse depth map are adjusted to obtain color maps and sparse depth maps in n types of resolutions.

After acquiring the color map and the sparse depth map, the computer device adjusts the resolutions of the color map and the sparse depth map to obtain the color maps and the sparse depth maps in n types of resolutions, where n is a positive integer, and optionally, n is a positive integer greater than 1. In some embodiments, the computer device adjusts the resolutions of the color map and the sparse depth map directly by means of compression software, or by means of a sampling function. In some embodiments, the computer device reduces the resolutions of the color map and the sparse depth map, or increases the resolutions of the color map and the sparse depth map.

There is an association between a resolution of an image and a size of the image. A larger resolution of the image results in a larger size of the image. A smaller resolution of the image results in a smaller size of the image. Therefore, in an embodiment, adjusting the resolutions of the color map and the sparse depth map means adjusting sizes of the color map and the sparse depth map, to obtain the color maps and the sparse depth maps in n types of sizes. By adjusting the resolutions of the color map and the sparse depth map, different features of an object in the target scenario may be highlighted. For example, when the resolutions of the color map and the sparse depth map are reduced, the sizes of the color map and the sparse depth map are reduced, and overall contour information of the object in the target scenario is highlighted. In a case in which the resolutions of the color map and the sparse depth map are increased, the sizes of the color map and the sparse depth map increase, and local detail information of the object in the target scenario is highlighted.

In Step 230, a cascade hourglass network to process the color maps and the sparse depth maps in the n types of resolutions can be invoiced to obtain prediction result maps in the n types of resolutions.

An hourglass network refers to a convolutional neural network structure that can identify or predict an image by using multi-layer convolutional features of an image. The computer device invokes the hourglass network to process an image to obtain a prediction result corresponding to the image. A cascade hourglass network, also referred to as a stacked hourglass model (SHM), refers to a network structure in which multiple hourglass networks are connected in series.

In an example, the computer device invokes the cascade hourglass network to process the color maps and the sparse depth maps in n types of resolutions. Each level of hourglass network in the cascade hourglass network may process color maps and sparse depth maps in different resolutions. Because features of the object in the target scenario that are highlighted by the color maps and the sparse depth maps in different resolutions are different, each level of hourglass network may emphatically predict different features of the object in the target scenario in a processing process. For example, if a level of hourglass network processes a color map and a sparse depth map in a relatively high resolution, the hourglass network predicts locally-detailed features of the object (due to a smaller filter perception field) in the target scenario. If a level of hourglass network processes a color map and a sparse depth map in a lower resolution, the level of hourglass network predicts overall-contour features of the object (due to a larger filter perception field) in the target scenario.

Each level of hourglass network in the cascade hourglass network may output prediction result maps corresponding to resolutions of an inputted color map and sparse depth map. That is, the computer device invokes the cascade hourglass network to process the color maps and the sparse depth maps in the n types of resolutions, so as to obtain the prediction result maps in the n types of resolutions. In a process in which the computer device invokes the cascade hourglass network to process the color maps and the sparse depth maps in the n types of resolutions, a color map in each resolution is used for instructing the hourglass network to fill in pixels in the sparse depth map in the resolution, so as to obtain a dense depth map in the resolution. Therefore, the prediction result maps in the n types of resolutions as obtained by the computer device include the dense depth maps in the n types of resolutions.

In some embodiments, a current-level hourglass network in the cascade hourglass network is configured to process a prediction result map(s) corresponding to a previous-level hourglass network, and a color map and a sparse depth map in a resolution type corresponding to the current-level hourglass network, to obtain a prediction result map in the resolution type corresponding to the current-level hourglass network. The prediction result map(s) corresponding to the previous-level hourglass network is obtained after resolution conversion (for example, upsampling) is performed on a prediction result map(s) in a resolution type corresponding to the previous-level hourglass network.

In Step 240, according to the dense depth maps in the n types of resolutions, a dense depth map corresponding to the target scenario can be generated.

Each level of hourglass network in the cascade hourglass network highlights different features of the object in the target scenario. Therefore, to obtain a relatively comprehensive prediction result for the target scenario, the computer device may generate, according to the dense depth maps in the n types of resolutions that are outputted by the cascade hourglass network, the dense depth map corresponding to the target scenario. In some embodiments, the computer device combines the dense depth maps in the n types of resolutions by using a residual connection to generate the dense depth map corresponding to the target scenario. Alternatively, the computer device extracts pixels of the dense depth maps in the n types of resolutions, and then combines the pixels to generate the dense depth map corresponding to the target scenario.

In an example, the computer device first adjusts a resolution of a dense depth map outputted by each level of hourglass network, so that the dense depth map corresponding to the target scenario is generated according to dense depth maps in the same resolution, thereby reducing operation complexity of the computer device in a process of generating the dense depth map corresponding to the target scenario. For example, step 240 can include converting resolutions of the dense depth maps in the n types of resolutions into a preset resolution to obtain n dense depth maps in a same resolution; and combining the n dense depth maps in the same resolution by using a residual connection, to obtain the dense depth map corresponding to the target scenario. The preset resolution is a preset resolution size. In an embodiment, the computer device may preset a value of the preset resolution. For example, the value of the preset resolution is preset to a value of a resolution of the color map and the sparse depth map corresponding to the target scenario. The computer device may further preset a manner of determining a specific value of the preset resolution. For example, the computer device may determine that a value of a maximum resolution in the n types of resolutions is the value of the preset resolution, or determine that a value of an average resolution in the n types of resolutions is the value of the preset resolution.

In a possible implementation, a training process of the cascade hourglass network includes the following several steps: calculating, for a level-k hourglass network in the cascade hourglass network, a predicted loss value of the level-k hourglass network according to a sparse depth map in a $k^{th}$ type of resolution and a dense depth map in the $k^{th}$ type of resolution, the predicted loss value being used for representing a prediction error of predicting the dense depth map in the $k^{th}$ type of resolution by using the sparse depth map in the $k^{th}$ type of resolution, and k being a positive integer; calculating a predicted loss value of the cascade hourglass network according to weight parameter settings and the predicted loss values of each level of the hourglass network, the weight parameter settings referring to settings of weight parameters of predicted loss values of the n types of resolutions; and adjusting a parameter of the cascade hourglass network according to the predicted loss value of the cascade hourglass network.

For training of the hourglass network, a loss value corresponding to the hourglass network may be first calculated, and then parameters of the hourglass network are adjusted according to the loss value. In a case in which the loss value converges, training of the hourglass network is completed. In an example, the loss value of the cascade hourglass network is calculated. The computer device first calculates a loss value of each level of hourglass network, then calculates the loss value of the cascade hourglass network according to weight parameter settings and the loss value of each level of hourglass network, and then adjusts the parameters of the cascade hourglass network according to the loss value of the cascade hourglass network, so that the loss value of the cascade hourglass network converges, so as to complete training of the cascade hourglass network. This disclosure imposes no limitation on a specific setting policy for weight parameter settings. In an example, the computer device may randomly set a weight parameter of each level of hourglass network, or may set a weight parameter of each level of hourglass network according to a usage preference. For example, in an example process, if a user more focuses on local detail prediction of the object in the target scenario, the computer device may set a relatively high weight parameter for an hourglass network to which a color map and a sparse depth map with relatively high resolutions are inputted, and may set a relatively low weight parameter for an hourglass network to which a color map and a sparse depth map with relatively low resolutions are inputted.

According to the technical solution provided herein, a color map and a sparse depth map corresponding to a target scenario are obtained, then resolutions of the color map and the sparse depth map are adjusted to obtain color maps and sparse depth maps in multiple types of resolutions, and a cascade hourglass network is invoked to process the color maps and the sparse depth maps in the multiple types of resolutions to obtain prediction result maps in the multiple types of resolutions. A prediction result map in each resolution includes a dense depth map in the respective resolution. A computer device may generate, according to the dense depth maps in the multiple types of resolutions, a dense depth map corresponding to the target scenario, thereby providing a manner (method) of generating a dense depth map by filling in pixels in a sparse depth map, that is, providing a depth completion manner (method).

In addition, in an embodiment, because different features of an object in the target scenario are highlighted by using color maps and sparse depth maps in different resolutions, the color maps and the sparse depth maps in different resolutions are each input to a respective level of hourglass network, so that different features of the object in the target scenario can be emphatically predicted. While reducing processing overheads of the computer device and the operation amount of the hourglass network, different features of the object in the target scenario can be deeply mined, so that a depth completion result, that is, the dense depth map corresponding to the target scenario, is more accurate.

In addition, an embodiment of this application further provides a method for training a cascade hourglass network. The method can include, first calculating a loss value of each level of hourglass network in the cascade hourglass network, then calculating a loss value of the cascade hourglass network according to weight parameter settings and the loss value of each level of hourglass network, and then adjusting parameters of the cascade hourglass network according to the loss value of the cascade hourglass network, so that in a case in which the loss value of the cascade hourglass network converges, training of the cascade hourglass network is completed. Compared with a case in which overall effect of a cascade hourglass network cannot be ensured to be optimal when each level of hourglass network in the cascade hourglass network is trained separately, in the technical solution provided in this embodiment of this application, the cascade hourglass network is trained as a whole, which can ensure an overall prediction effect of the cascade hourglass network, thereby ensuring accuracy of the dense depth map corresponding to the target scenario and outputted by the cascade hourglass network.

Figure 3:
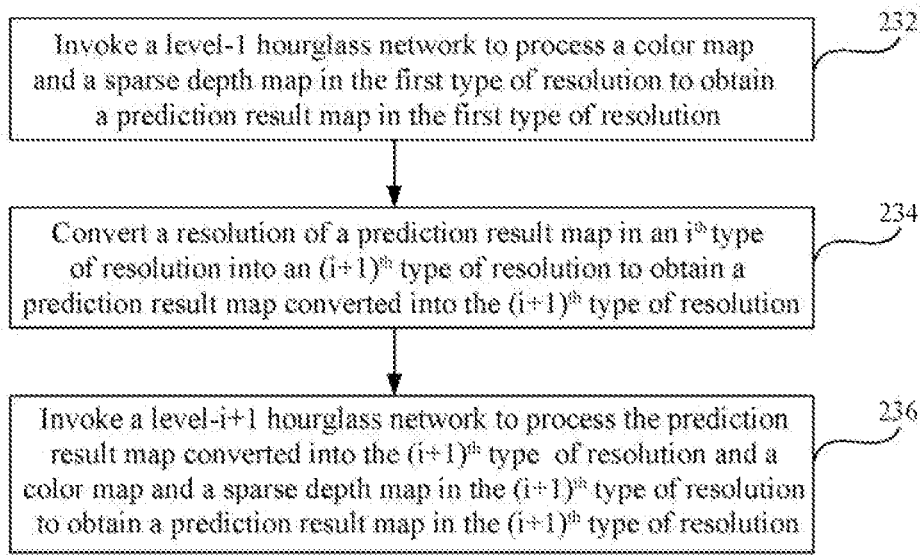
FIG. 3 is a flowchart of an operation method of a cascade hourglass network according to an embodiment of this application.

In an example, as shown in FIG. 3, a number of levels of hourglass networks included in the foregoing cascade hourglass network is equal to n. Step 230 includes the following several steps.

In Step 232, a level-1 hourglass network to process a color map and a sparse depth map in the first type of resolution can be invoked to obtain a prediction result map in the first type of resolution.

In an example, a color map and a sparse depth map in the first type of resolution are inputted to the level-1 hourglass network, and the color map in the first type of resolution may be used for instructing to fill in pixels in the sparse depth map in the first type of resolution. After the level-1 hourglass network processes the color map and the sparse depth map in the first type of resolution, a prediction result map in the first type of resolution is outputted, that is, a resolution of the prediction result map outputted by the hourglass network is the same as resolutions of the inputted color map and sparse depth map.

In Step 234, a resolution of a prediction result map in an $i^{th}$ type of resolution is converted into an $(i+1)^{th}$ type of resolution to obtain a prediction result map having the $(i+1)^{th}$ type of resolution.

When resolutions of a color map and a sparse depth map that are inputted to a level-i hourglass network is the $i^{th}$ type of resolution, a resolution of a prediction result map outputted by the level-i hourglass network is also the $i^{th}$ type of resolution, that is, the prediction result map in the $i^{th}$ type of resolution is a prediction result map obtained by using the level-i hourglass network, where i is a positive integer less than n. To enable another level of hourglass network to combine a prediction result of an hourglass network that has obtained a prediction result map when predicting a color map and a sparse depth map, after obtaining the prediction result map in the $i^{th}$ type of resolution, the computer device may convert the resolution of the prediction result map of the $i^{th}$ type of resolution. In an example, the computer device converts the resolution of the prediction result map in the $i^{th}$ type of resolution into the $(i+1)^{th}$ type of resolution, to obtain the prediction result map converted into the $(i+1)^{th}$ type of resolution, so that the prediction result map converted into the $(i+1)^{th}$ type of resolution can be used by a level-(i+1) hourglass network, and a prediction result map of the level-(i+1) hourglass network is more accurate.

Figure 4:
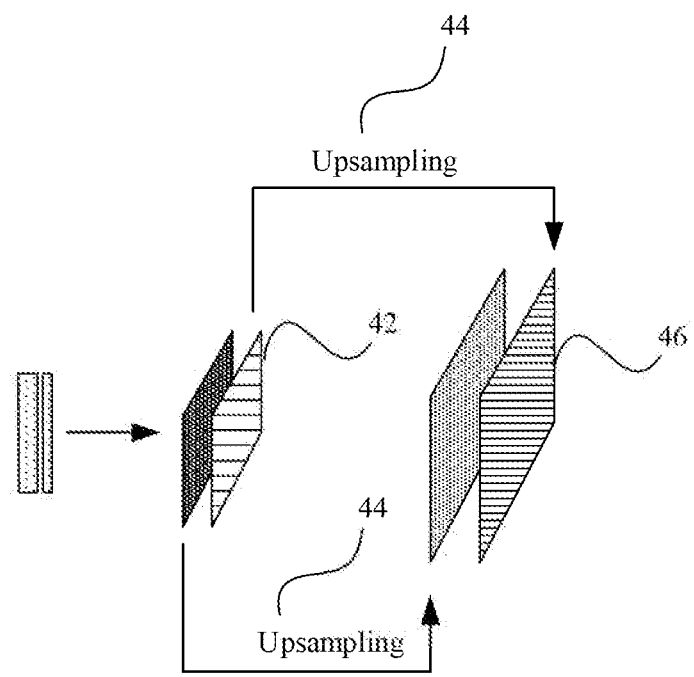
FIG. 4 is a schematic diagram of resolution conversion according to an embodiment of this application.

In an example, upsampling is performed on the prediction result map in the $i^{th}$ type of resolution to obtain the prediction result map converted into the $(i+1)^{th}$ type of resolution. A specific manner of upsampling is not limited. In an example, the computer dev ice may perform upsampling on the prediction result map in the $i^{th}$ type of resolution by using an interpolation algorithm such as interpolation based on an edge image or image interpolation based on a region, that is, interpolating new pixels between original pixels. In an example, the computer device may perform upsampling on the prediction result map in the $i^{th}$ type of resolution by means of deconvolution. After the upsampling, the resolution of the prediction result map in the $i^{th}$ type of resolution increases. The computer device may set a parameter of the interpolation algorithm to control the resolution of the prediction result map in the $i^{th}$ type of resolution to increase to the $(i+1)^{th}$ type of resolution, so as to obtain the prediction result map converted into the $(i+1)^{th}$ type of resolution. As shown in FIG. 4, the level-i hourglass network outputs a prediction result map 42 in the $i^{th}$ type of resolution, and the computer device may perform upsampling 44 on the prediction result map 42 in the $i^{th}$ type of resolution, so as to increase a resolution of the prediction result map 42, that is, enlarge a size of the prediction result map 42, so as to obtain a prediction result map 46 converted into the $(i+1)^{th}$ type of resolution.

In Step 236: Invoke a level-(i+1) hourglass network to process the prediction result map converted into the $(i+1)^{th}$ type of resolution together with a color map and a sparse depth map in the $(i+1)^{th}$ type of resolution to obtain a prediction result map in the $(i+1)^{th}$ type of resolution.

Different from the input to the level-1 hourglass network, an input to the level-(i+1) hourglass network is the prediction result map converted into the $(i+1)^{th}$ type of resolution, and a color map and a sparse depth map in the $(i+1)^{th}$ type of resolution. That is, the level-(i+1) hourglass network performs prediction based on the prediction result of the level-i hourglass network. Therefore, the prediction result of the level-i hourglass network may provide a reference for prediction of the level-(i+1) hourglass network, so that tightness and association between operations of various levels of hourglass networks are improved, and the prediction result of the cascade hourglass network is more accurate.

Figure 5:
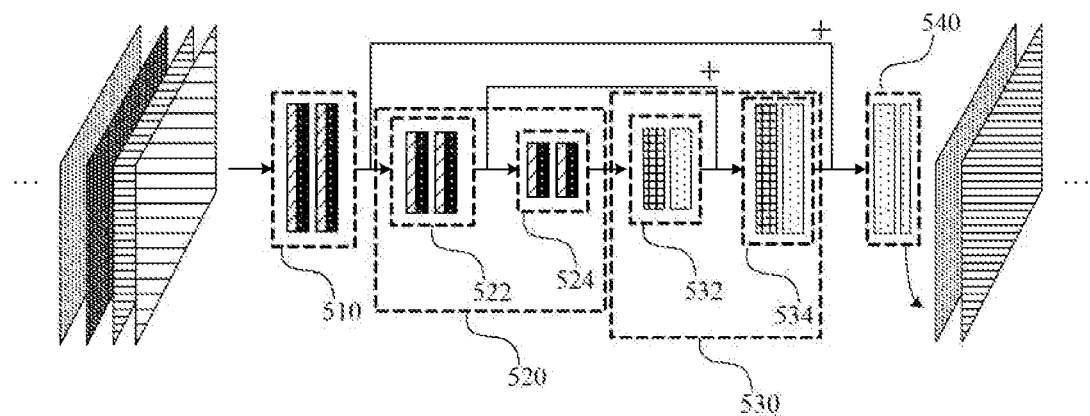
FIG. 5 is a schematic structural diagram of an hourglass network according to an embodiment of this application.

In an example, the level-(i+1) hourglass network includes an initial layer, a downsampling layer, an upsampling layer, and a prediction layer. As shown in FIG. 5, the level-(i+1) hourglass network includes an initial layer 510, a downsampling layer 520, an upsampling layer 530, and a prediction layer 540. Step 236 can include the following steps from (1) to (4).

In Step (1), fusion processing on the prediction result map converted into the $(i+1)^{th}$ type of resolution and the color map and the sparse depth map in the $(i+1)^{th}$ type of resolution can be performed by using tire initial layer 510, to obtain a fused feature map.

In an example, a function of an initial layer of a level of hourglass network is to fuse images inputted to the level of hourglass network. For example, after the prediction result map converted into the $(i+1)^{th}$ type of resolution, the color map and the sparse depth map in the $(i+1)^{th}$ type of resolution pass through the initial layer 510 of the level-(i+1) hourglass network, the fused feature map can be obtained. In an example, the initial layer 510 may perform, in a feature dimension, fusion processing on an input to an hourglass network in which the initial layer is located, that is, the initial layer of the level-(i+1) hourglass network may fuse, in the feature dimension, the prediction result map converted into the $(i+1)^{th}$ type of resolution, the color map and the sparse depth map in the $(i+1)^{th}$ type of resolution. The fused feature map obtained by using the initial layer is a result of stacking a group of images in the feature dimension.

In an example, the prediction result maps in the n types of resolutions each include a respective feature guide map and/or a respective dense depth map in one of the n types of resolutions, and for example, the feature guide map is used for guiding a prediction of a dense depth map based on a sparse depth map. The foregoing step (1) includes: combining a feature guide map in the prediction result map converted into the $(i+1)^{th}$ type of resolution and the color map in the $(i+1)^{th}$ type of resolution to obtain a first feature map; combining a dense depth map in the prediction result map convened into the $(i+1)^{th}$ type of resolution and the sparse depth map in the $(i+1)^{th}$ type of resolution to obtain a second feature map; and performing fusion processing on the first feature map and the second feature map in a feature dimension by using the initial layer, to obtain the fused feature map.

In an example, in addition to the dense depth map in the $i^{th}$ type of resolution, the prediction result map outputted by the level-i hourglass network further includes a feature guide map in the $i^{th}$ type of resolution. The feature guide map is generated after a feature of an image in the $i^{th}$ type of resolution is extracted in a processing process of the level-i hourglass network and processed. After the feature guide map in the $i^{th}$ type of resolution is converted into the $(i+1)^{th}$ type of resolution, the computer device may be instructed to fill in the sparse depth map in the $(i+1)^{th}$ type of resolution with reference to the color map in the $(i+1)^{th}$ type of resolution. When the inputted image is fused at the initial layer of the level-(i+1) hourglass network, the feature guide map in the prediction result map converted into the $(i+1)^{th}$ type of resolution and the color map in the $(i+1)^{th}$ type of resolution may be first combined to obtain the first feature map (or image), the dense depth map in the prediction result map converted into the $(i+1)^{th}$ type of resolution and the sparse depth map in the (if I)* type of resolution are combined to obtain the second feature map (or image), and then the first feature map and the second feature map are fused in the feature dimension to obtain the fused feature map (or image). In some embodiments, the computer device simultaneously generates the first feature map and the second feature map.

In Step (2), downsampling on the fused feature map can be performed by using the downsampling layer 520 to obtain a downsampled feature map.

Downsampling of the fused feature image or map can reduce a resolution of the fused feature image, that is, reduce a size of the fused feature image, and increase a receptive field of each pixel in the feature image or map. In an example, the down sampling layer may perform downsampling on the fused feature map by using a filler(s), so as to extract a feature from the fused feature map to obtain the downsampled feature map.

In an example, the fused feature image obtained at the initial layer 510 includes a first feature image pan and a second feature image pan, the first feature image part corresponds to the first feature image (or map), and the second feature image part corresponds to the second feature image (or map). Because data processing manners of the first feature map part and the second feature map part are different, downsampling is separately performed on the first feature map part and the second feature map part in a case of passing through the downsampling layer 520, that is, the downsampling layer performs downsampling on the first feature map part and the second feature map part in separate downsampling manners. In some embodiments, the downsampling layer includes two groups of filters, one set of filters is configured to process the first feature map part in the fused feature map, and the other set of filters is configured to process the second feature map part in the fused feature map.

Figure 6:
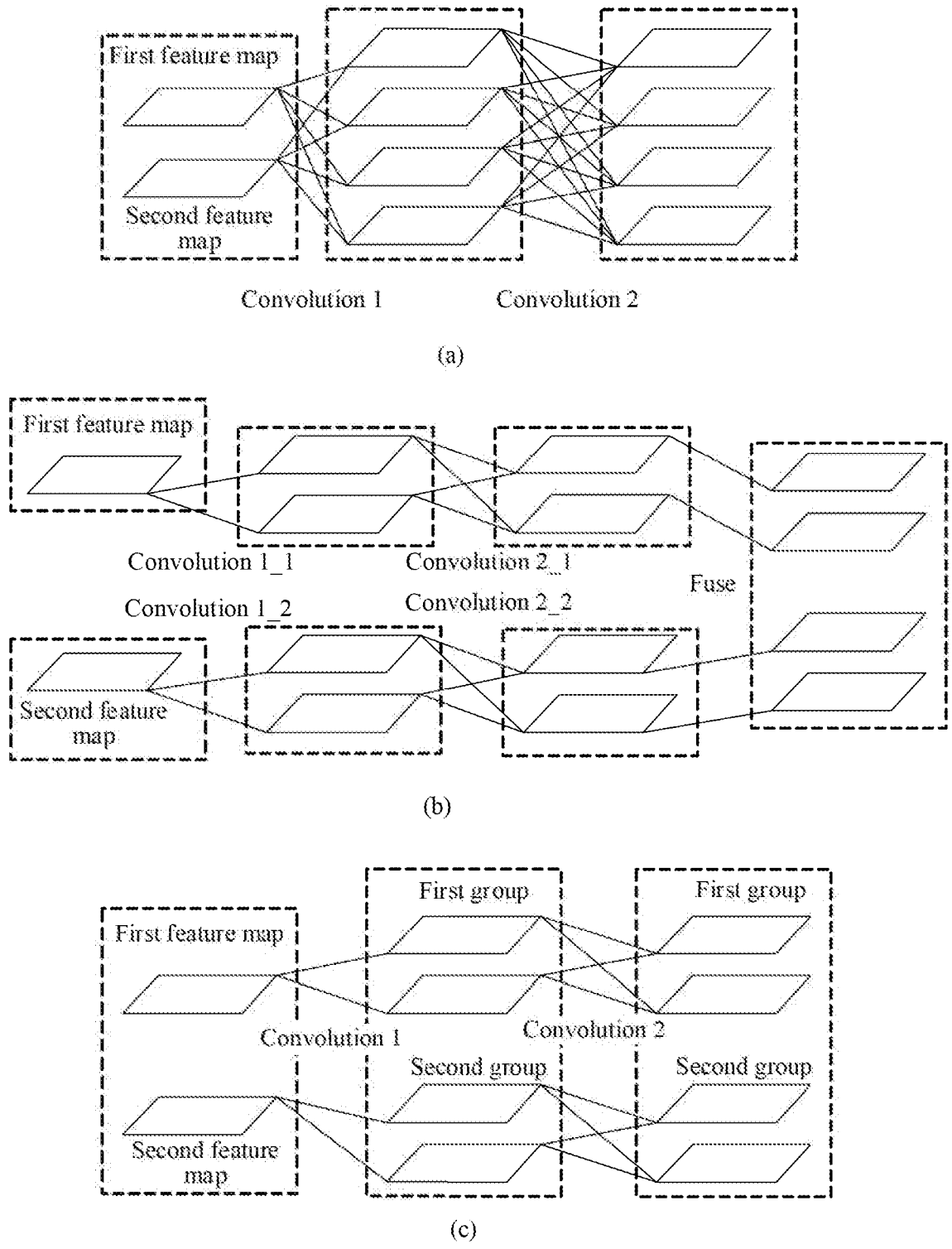
FIG. 6 is a schematic diagram of different data fusion manners according to an embodiment of this application.

In an embodiment, the inputted image(s) is first fused by using the initial layer 510, and then the first feature map part and the second feature map part of the fused feature map are separately downsampled by using the downsampling layer 520. This manner may be referred to as group fusion. As shown in FIG. 6, portion (a) in FIG. 6 represents an operation manner of early fusion, portion (b) represents an operation manner of late fusion, and portion (c) represents an operation manner of group fusion. In both early fusion (a) and group fusion (c), the computer device first fuses the first feature map and the second feature map. However, when the fused feature map is downsampled, grouping is not performed in early fusion (a). Compared with group fusion (c), operation of early fusion (a) is relatively complex, and an operation amount is relatively large. In both late fusion (b) and group fusion (c), the computer device performs separate downsampling on the first feature map and the second feature map. However, late fusion (b) does not first perform fusion processing on the first feature map and the second feature map. Therefore, two filtering manners need to be used for downsampling the first feature map and the second feature map. Because group fusion (c) first performs fusion processing on the first feature map and the second feature map, downsampling may be performed on the first feature map part and the second feature map part in the same filtering manner. Compared with late fusion (b), group fusion (c) has relatively high calculation parallelism, and processing overheads of the computer device can be reduced.

When downsampling is performed on the fused feature map, the resolution of the fused feature map is reduced, the size of the fused feature map is reduced, an overall contour of the fused feature map is highlighted, and overall contour information of the object in the target scenario is extracted by means of downsampling. Optionally, to make the feature of the target object extracted by means of downsampling more accurate, and extract deep-level semantics, and further expand a receptive field of a pixel, the downsampling layer may include two layers of downsampling, that is, a first downsampling layer and a second downsampling layer. After downsampling the fused feature map by using the first downsampling layer, the computer device may input a result of the first downsampling layer to the second downsampling layer for further downsampling, so as to obtain the downsampled feature map.

In Step (3), upsampling can be performed on the downsampled feature map by using the upsampling layer 530 to obtain a feature map in the $(i+1)^{th}$ type of resolution.

A resolution of the downsampled feature image obtained by downsampling the fused feature map is less than a resolution of an image inputted to an hourglass network. The hourglass network needs to perform prediction according to the downsampled feature map, and needs to output a prediction result map with the same resolution as the inputted image. Therefore, before predicting the downsampled feature map, the resolution of the downsampled feature map needs to be first increased. In this embodiment of this application, the downsampled feature map is upsampled to increase the resolution, to obtain a feature map in the $(i+1)^{th}$ type of resolution. In an example, the downsampled feature map is upsampled as a whole.

In an example, when the downsampling layer includes two layers of downsampling, the upsampling layer includes two layers of sampling, that is, a first upsampling layer and a second upsampling layer. The first upsampling layer and the second upsampling layer increase the resolution of the downsampled feature map step by step. Compared with directly increasing the resolution of the downsampled feature map to the $(i+1)^{th}$ type of resolution, some information in the feature map may be ignored. In an example, in a manner of increasing the resolution by the two layers of upsampling step by step, an output of the first downsampling layer may be fused in an input to the second upsampling layer, thereby reducing information loss in the feature map, so that an upsampled feature map in the $(i+1)^{th}$ type of resolution more accurately reflects downsampled feature data.

In Step (4), the feature map in the $(i+1)^{th}$ type of resolution can be predicted by using the prediction layer 540 to obtain the prediction result map in the type of resolution.

After the downsampled feature map is converted into the feature map in the $(i+1)^{th}$ type of resolution, the feature map in the $(i+1)^{th}$ type of resolution is predicted by using the prediction layer 540, so as to obtain the prediction result map in the $(i+1)^{th}$ type of resolution. In an example, the prediction result map in the $(i+1)^{th}$ type of resolution includes a dense depth map in the $(i+1)^{th}$ type of resolution and a feature guide map in the $(i+1)^{th}$ type of resolution. When the computer device predicts the feature map in the $(i+1)^{th}$ type of resolution, the feature map in the $(i+1)^{th}$ type of resolution is used as a whole for prediction. In an example, a filter that performs prediction at the prediction layer 540 includes two convolution kernels, and parameter settings of the two convolution kernels are the same. Therefore, one convolution kernel is used for calculating the dense depth map in the $(i+1)^{th}$ type of resolution, and the other convolution kernel is used for calculating the feature guide map in the $(i+1)^{th}$ type of resolution. The dense depth map in the $(i+1)^{th}$ type of resolution is a result of filling in, by the level-$(i+1)$ hourglass network, pixels in the sparse depth map in the $(i+1)^{th}$ type of resolution. The feature guide map in the $(i+1)^{th}$ type of resolution is used for combining with a color map in an $(i+2)^{th}$ type of resolution in the level-$(i+2)$ hourglass network, so as to instruct the computer device to fill in pixels in a sparse depth map in the $(i+2)^{th}$ type of resolution. In an example, to increase a network depth and improve network performance, the upsampling layer and the prediction layer of the hourglass network include standard (or normalized) convolution. The standard convolution is an intermediate processing process, and can increase the network depth of the hourglass network. As shown in FIG. 5, both the upsampling layer and the prediction layer of the level-(i+1) hourglass network include standard convolution.

In an example, in a case in which the downsampling layer includes the first downsampling layer and the second downsampling layer, and the upsampling layer includes the first upsampling layer and the second upsampling layer, the output of the initial layer and the output of the second upsampling layer are combined by using a residual connection, to obtain an input to the prediction layer; and the output of the first downsampling layer and the output of the first upsampling layer are combined by using the residual connection, to obtain an input to the second upsampling layer. For example, as shown in FIG. 5, an output of an initial layer 510 and an output of a second upsampling layer 534 are combined into an input to a prediction layer 540 by using a residual connection, and an output of a first downsampling layer 522 and an output of a first upsampling layer 532 are combined into an input to the second upsampling layer 534 by using the residual connection. Because the first upsampling layer 532 is used for increasing a resolution of the output of the second downsampling layer 524, a part of information loss occurs in a process of increasing the resolution. If only the output of the first upsampling layer 532 is inputted to the second upsampling layer 534, a part of features of an object in a target scenario that are extracted by the second downsampling layer 524 is ignored. Therefore, in this embodiment of this application, the input to the second upsampling layer 534 fuses the output of the first downsampling layer 522, which can effectively use data and avoid information loss. Similarly, fusing the output of the initial layer 510 in the input to the prediction layer 540 may also avoid information loss, making the prediction result more accurate.

In an example, in a case in which the downsampling layer includes the first downsampling layer and the second downsampling layer, and the upsampling layer includes the first upsampling layer and the second upsampling layer, the output of the first downsampling layer and the output of the second upsampling layer are combined by using a residual connection, to obtain an input to the prediction layer; and the output of the second downsampling layer and the output of the first upsampling layer are combined by using the residual connection, to obtain an input to the second upsampling layer. For example, as shown in FIG. 5, an output of a first downsampling layer 522 and an output of a second upsampling layer 534 are combined into an input to a prediction layer 540 by using a residual connection, and an output of a second downsampling layer 524 and an output of a first upsampling layer 532 are combined into an input to the second upsampling layer 534 by using the residual connection. Because the first upsampling layer 532 is used for increasing a resolution of the output of the second downsampling layer 524, a part of information loss occurs in a process of increasing the resolution. If only the output of the first upsampling layer 532 is inputted to the second upsampling layer 534, a part of features of an object in a target scenario that are extracted by the second downsampling layer 524 is ignored. Therefore, in this embodiment of this application, the input to the second upsampling layer 534 fuses the output of the second downsampling layer 524, which can effectively use data and avoid information loss. Similarly, fusing the output of the first downsampling layer 522 in the input to the prediction layer 540 may also avoid information loss, making the prediction result more accurate.

According to the technical solution provided herein, when a level of hourglass network is invoked to process a color map and a sparse depth map in a resolution, a prediction result map outputted by a previous-level hourglass network is fused. Because different features of an object in a target scenario are highlighted by color maps and sparse depth maps in different resolutions and different features are associated with each other, based on a prediction result of the previous-level hourglass network, features highlighted by a color map and a sparse depth map that are corresponding to a current-level hourglass network are emphatically extracted and predicted, so that the prediction result of the previous-level hourglass network can provide a reference for prediction of the current-level hourglass network, thereby improving overall accuracy of the cascade hourglass network.

In addition, in an embodiment, each level of hourglass network includes an initial layer, a downsampling layer, an upsampling layer, and a prediction layer. In addition, the initial layer and the downsampling layer use a data processing manner of group fusion, that is, first inputted images are fused in a feature dimension, and then a part of a fused image that uses a different data processing manner is downsampled separately. Compared with early fusion in which downsampling is performed on fused images as a whole, which results in complex calculation and an excessively large operation amount, group fusion provided in this embodiment of this application can reduce operation complexity of a cascade hourglass network. In addition, compared with late fusion in which inputted images are not fused in advance and inputted images in different data processing manners need to be processed in different downsampling manners, group fusion may separately process parts in different data processing manners in a feature map in the same downsampling manner by using independent downsampling channels, which can improve calculation parallelism and reduce processing overheads of the computer device.

Figure 7:
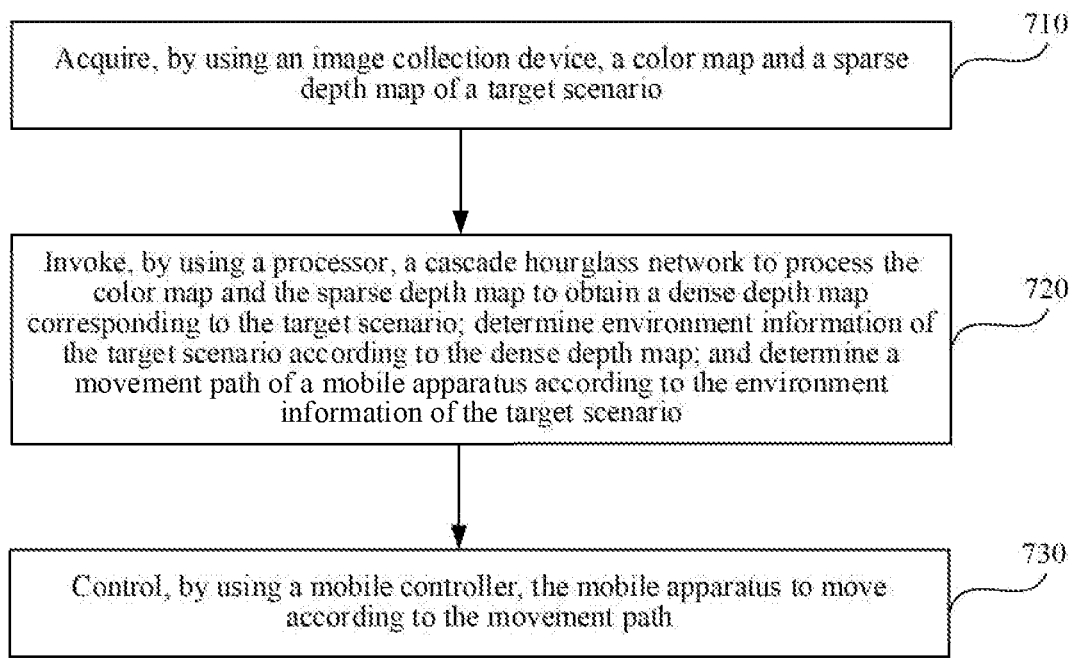
FIG. 7 is a flowchart of a path planning method according to an embodiment of this application.

FIG. 7 is a flowchart of a path planning method according to an embodiment of this application. The method is applied to the foregoing mobile apparatus, and the mobile apparatus includes a processor, an image collection device and a mobile controller that are connected to the processor. The method may include the following steps:

In Step 710, by using the image collection device, a color map and a sparse depth map of a target scenario can be acquired.

A generation process can be performed to generate the sparse depth map, the target scenario, the color map. and the like.

In Step 720, by using the processor, a cascade hourglass network can be invoked to process the color map and the sparse depth map to obtain a dense depth map corresponding to the target scenario; environment information of the target scenario can be determined according to the dense depth map; and a movement path of the mobile apparatus can be determined according to the environment information of the target scenario.

The environment information of the target scenario includes feature information of a target object in the target scenario and a scenario structure of the target scenario. The target object is an object that exists in the target scenario, such as a tree, a building, a vehicle, and the like. The feature information of the target object includes distance information, speed information, and the like of the target object.

In an example, after determining the environment information of the target scenario, the computer device may determine the movement path of the mobile apparatus in the target scenario according to the environment information, so as to achieve a purpose of moving and controlling the mobile apparatus. In an example, the determining a movement path of the mobile apparatus according to the environment information of the target scenario includes: determining an obstacle in the target scenario according to the environment information of the target scenario; and determining the movement path according to the obstacle. In the target scenario, there are many obstacles that cannot be traversed by the mobile apparatus, such as a wall or a railing. Therefore, the computer device needs to determine the obstacle in the target scenario according to the environment information of the target scenario, and then determine the movement path according to the obstacle, so that the mobile apparatus can bypass the obstacle in a movement process and avoid colliding with the obstacle.

In Step 730, by using the mobile controller, the mobile apparatus can move according to the movement path.

After determining the movement path, the processor may send the movement path to the mobile controller, and the mobile controller controls the mobile apparatus to move according to the movement path, so that the mobile apparatus can achieve an automatic movement effect.

According to the technical solution provided in this embodiment of this application, the color map and the sparse depth map of the target scenario that are collected by the image collection device are acquired, then the cascade hourglass network is invoked to process the color map and the sparse depth map to obtain the dense depth map corresponding to the target scenario, then the environment information of the target scenario is determined according to the dense depth map, and the movement path of the mobile apparatus in the target scenario is determined according to the environment information, thereby providing a path planning method of the mobile apparatus. In addition, in a path planning process, after the color map and the sparse depth map of the target scenario that are collected by the image collection device are processed by using the cascade hourglass network to obtain the dense depth map, path planning is performed according to the dense depth map, and the dense depth map may reflect more environment information of the target scenario, so that a result of path planning can be more accurate.

Figure 8:
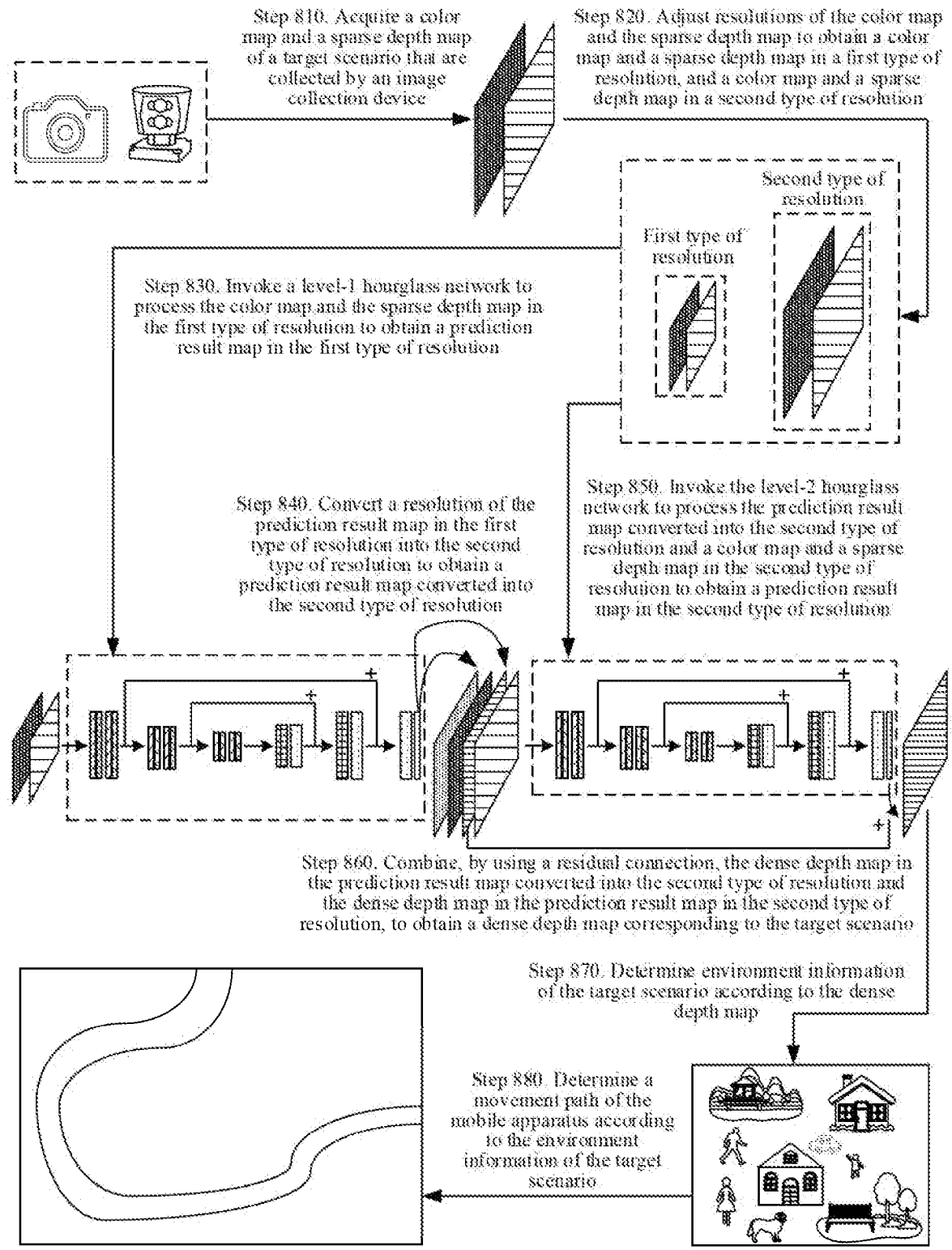
FIG. 8 is a flowchart of an image processing and path planning method according to an embodiment of this application.

FIG. 8 is a flowchart of an image processing and path planning method according to an embodiment of this application. The method may be applied to the foregoing computer device. The foregoing cascade hourglass network includes a level-1 hourglass network and a level-2 hourglass network, the foregoing n types of resolutions include the first type of resolution and the second type of resolution, and the first type of resolution is different from the second type of resolution. The method may include the following steps.

In Step 810, a color map and a sparse depth map of a target scenario that are collected by an image collection device of a mobile apparatus can be acquired. In an example, the image collection device is a laser radar and a color camera. The color camera may photograph the target scenario to form an RGB image, and further, a grayscale image may be generated according to the RGB image. The laser radar may detect an object in the target scenario, so as to obtain radar point cloud data corresponding to the target scenario, and further generate a sparse depth map according to the radar point cloud data.

In Step 820, resolutions of the color map and the sparse depth map can be adjusted to obtain a color map and a sparse depth map in the first type of resolution, and a color map and a sparse depth map in the second type of resolution. In an example, the computer device may directly perform adjustment by using compression software, or may perform adjustment by using a sampling function. As shown in FIG. 8, an example in which the first type of resolution is equal to one half of the resolutions of the color map and the sparse depth map corresponding to the target scenario, and the second type of resolution is equal to the resolutions of the color map and the sparse depth map corresponding to the target scenario is used in this embodiment of this application for description.

In Step 830, a level-1 hourglass network can be invoked to process the color map and the sparse depth map in the first type of resolution to obtain a prediction result map in the first type of resolution. The computer device processes the color map and the sparse depth map in the first type of resolution by using an initial layer, a downsampling layer, an upsampling layer, and a prediction layer of the level-1 hourglass network, to obtain the prediction result map in the first type of resolution, where the prediction result map in the first type of resolution includes a dense depth map in the first type of resolution and a feature guide map in the first type of resolution.

In Step 840, the resolution of the prediction result map in the first type of resolution can be converted into the second type of resolution to obtain a prediction result map converted into the second type of resolution. To enable the level-2 hourglass network to combine the prediction result of the level-1 hourglass network when predicting the color map and the sparse depth map in the second type of resolution, the computer device may convert the resolution of the prediction result map in the first type of resolution into the second type of resolution to obtain the prediction result map converted into the second type of resolution. The prediction result map converted into the second type of resolution includes a dense depth map converted into the second type of resolution and a feature guide map converted into the second type of resolution.

In Step 850, the level-2 hourglass network can be invoked to process the prediction result map converted into the second type of resolution and a color map and a sparse depth map in the second type of resolution to obtain a prediction result map in the second type of resolution. In a processing process of the level-2 hourglass network, the dense depth map converted into the second type of resolution is combined with the sparse depth map in the second type of resolution, the feature guide map convened into the second type of resolution is combined with the color map in the second type of resolution, then combination results are further fused into a feature map in a feature dimension, and then the prediction result map in the second type of resolution is obtained by using the downsampling layer, the upsampling layer, and the prediction layer. The prediction result map in the second type of resolution includes the dense depth map in the second type of resolution and the feature guide map in the second type of resolution.

In Step 860, by using a residual connection, the dense depth map in the prediction result map converted into the second type of resolution and the dense depth map in the prediction result map in the second type of resolution can be combined, to obtain a dense depth map corresponding to the target scenario. Finally, the cascade hourglass network needs to output the dense depth map corresponding to the target scenario, that is, a result of filling in pixels of the sparse depth map by the computer device. Therefore, after each level of hourglass network obtains a prediction result map corresponding to the hourglass network, the computer device combines the dense depth map convened into the second type of resolution and the dense depth map in the second type of resolution, so as to obtain the dense depth map corresponding to the target scenario.

In Step 870, environment information of the target scenario can be determined according to the dense depth map. The environment information of the target scenario includes feature information of a target object in the target scenario and a scenario structure of the target scenario, where the target object is an object that exists in the target scenario, and the feature information of the target object includes distance information, speed information, and the like of the target object. The computer device may convert the dense depth map into point cloud data, and then may construct the target scenario according to the point cloud data, so as to determine the environment information of the target scenario, that is, the feature information of the target object in the target scenario and the scenario structure of the target scenario.

In Step 880, a movement path of the mobile apparatus can be determined according to the environment information of the target scenario. In an example, the computer device may first determine an obstacle in the target scenario according to the environment information of the target scenario, and then determine the movement path of the moving apparatus according to the obstacle. In the target scenario, there are many obstacles that cannot be traversed by the mobile apparatus. Therefore, the computer device needs to determine the obstacle in the target scenario according to the environment information of the target scenario, and then determine the movement path according to the obstacle, so that the mobile apparatus can bypass the obstacle in a movement process and avoid colliding with the obstacle.

Figure 9:
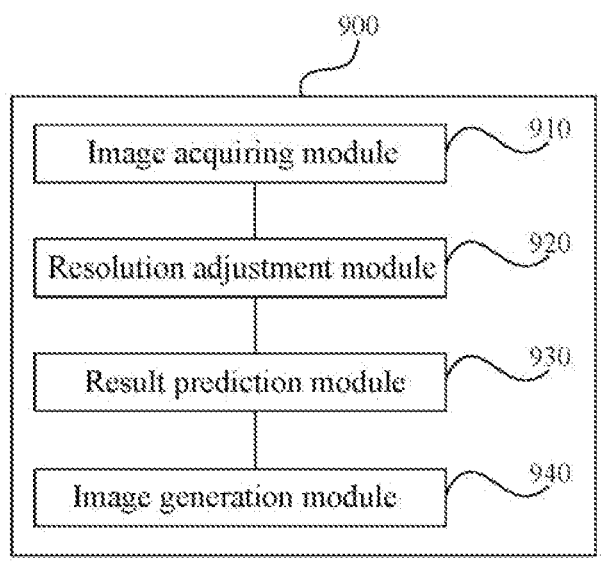
FIG. 9 is a block diagram of an image processing apparatus according to an embodiment of this application.

FIG. 9 is a block diagram of an image processing apparatus according to an embodiment of this application. The apparatus has functions of implementing the foregoing image processing method examples. The functions may be implemented by using hardware (processing circuitry, or may be implemented by hardware executing corresponding software. The apparatus may be a computer device, or may be disposed in a computer device. The apparatus 900 may include an image acquiring module 910, a resolution adjustment module 920, a result prediction module 930, and an image generation module 940.

The image acquiring module 910 is configured to acquire a color map and a sparse depth map that are corresponding to a target scenario.

The resolution adjustment module 920 is configured to adjust resolutions of the color map and the sparse depth map to obtain color maps and sparse depth maps in n types of resolutions, n being a positive integer.

The result prediction module 930 is configured to invoke a cascade hourglass network to process the color maps and the sparse depth maps in the n types of resolutions to obtain prediction result maps in the n types of resolutions, the prediction result maps in the n types of resolutions including dense depth maps in the n types of resolutions.

The image generation module 940 is configured to generate, according to the dense depth maps in the n types of resolutions, a dense depth map corresponding to the target scenario.

Figure 10:
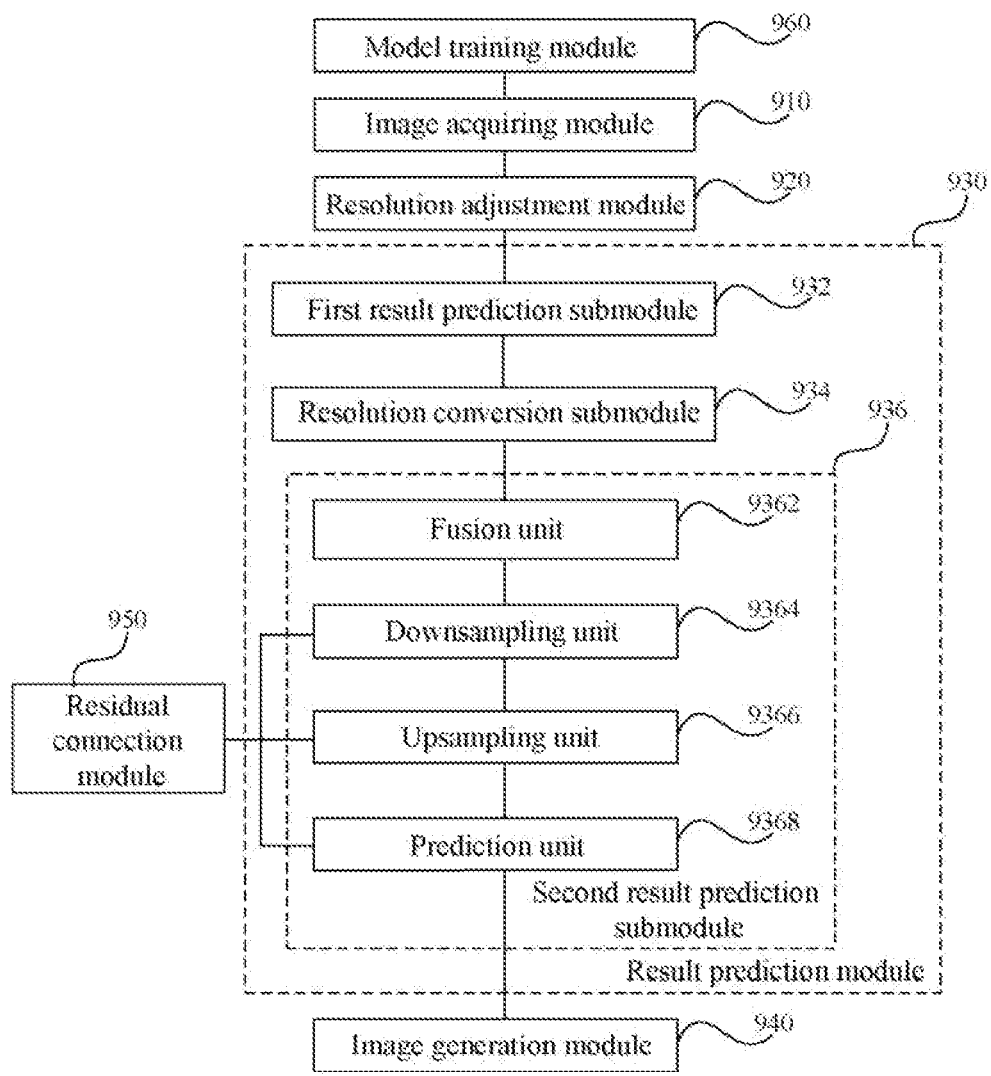
FIG. 10 is a block diagram of an image processing apparatus according to another embodiment of this application.

In an example, a quantity of levels of hourglass networks included in the cascade hourglass network is n. As shown in FIG. 10, the result prediction module 930 includes a first result prediction submodule 932, configured to invoke a level-1 hourglass network to process a color map and a sparse depth map in the first type of resolution to obtain a prediction result map in the first type of resolution; a resolution conversion submodule 934, configured to convert a resolution of a prediction result map in an $i^{th}$ type of resolution into an $(i+1)^{th}$ type of resolution to obtain a prediction result map converted into the $(i+1)^{th}$ type of resolution, the prediction result map in the $i^{th}$ type of resolution being a prediction result map obtained by using a level-i hourglass network, and i being a positive integer less than n; and a second result prediction submodule 936, configured to invoke a level-(i+1) hourglass network to process the prediction result map converted into the $(i+1)^{th}$ type of resolution and a color map and a sparse depth map in the $(i+1)^{th}$ type of resolution to obtain a prediction result map in the $(i+1)^{th}$ type of resolution.

In an example, the level-(i+1) hourglass network includes an initial layer, a downsampling layer, an upsampling layer, and a prediction layer. As shown in FIG. 10, the second result prediction submodule 936 includes, a fusion unit 9362, configured to perform fusion processing on the prediction result map converted into the $(i+1)^{th}$ type of resolution and the color map and the sparse depth map in the $(i+1)^{th}$ type of resolution by using the initial layer, to obtain a fused feature map; a downsampling unit 9364, configured to perform downsampling on the fused feature map by using the downsampling layer to obtain a downsampled feature map; an upsampling unit 9366, configured to perform upsampling on the downsampled feature map by using the upsampling layer to obtain a feature map in the $(i+1)^{th}$ type of resolution; and a prediction unit 9368, configured to predict the feature map in the $(i+1)^{th}$ type of resolution by using the prediction layer to obtain the prediction result map in the $(i+1)^{th}$ type of resolution.

In an example, the prediction result maps in the n types of resolutions further include feature guide maps in the n types of resolutions, and the feature guide maps are used for instructing to fill in a quantity of pixels in the sparse depth maps. The fusion unit 9362 is configured to: combine a feature guide map in the prediction result map converted into the $(i+1)^{th}$ type of resolution and the color map in the $(i+1)^{th}$ type of resolution to obtain a first feature map. combine a dense depth map in the prediction result map converted into the $(i+1)^{th}$ type of resolution and the sparse depth map in the $(i+1)^{th}$ type of resolution to obtain a second feature map; and perform fusion processing on the first feature map and the second feature map in a feature dimension by using the initial layer, to obtain the fused feature map; the fused feature map including a first feature map part and a second feature map part, and downsampling being separately performed on the first feature map part and the second feature map part in a case of passing through the downsampling layer.

In an example, the downsampling layer includes a first downsampling layer and a second downsampling layer, and the upsampling layer includes a first upsampling layer and a second upsampling layer. As shown in FIG. 10, the apparatus further includes a residual connection module 950, configured to: combine an output of the first downsampling layer and an output of the second upsampling layer by using a residual connection, to obtain an input to the prediction layer; and combine an output of the second downsampling layer and an output of the first upsampling layer by using the residual connection, to obtain an input to the second upsampling layer.

In an example, the image generation module 940 is configured to perform upsampling on the prediction result map in the $i^{th}$ type of resolution to obtain the prediction result map converted into the $(i+1)^{th}$ type of resolution.

In an example, n is equal to 2, the n types of resolutions include the first type of resolution and the second type of resolution, the first type of resolution is different from the second type of resolution, and the cascade hourglass network includes a level-1 hourglass network and a level-2 hourglass network that are cascaded. The result prediction module 930 is configured to: invoke the level-1 hourglass network to process a color map and a sparse depth map in the first type of resolution to obtain a prediction result map in the first type of resolution; convert a resolution of the prediction result map in the first type of resolution into the second type of resolution to obtain a prediction result map in the second type of resolution; and invoke the level-2 hourglass network to process the prediction result map converted into the second type of resolution and a color map and a sparse depth map in the second type of resolution to obtain a prediction result map in the second type of resolution.

In an example, the resolution adjustment module 920 is configured to: convert resolutions of the dense depth maps in the n types of resolutions into a preset resolution to obtain n dense depth maps in a same resolution; and combine the n dense depth maps in the same resolution by using a residual connection, to obtain the dense depth map corresponding to the target scenario.

In an example, as shown in FIG. 10, the apparatus further includes a model training module 960, configured to: calculate, for a level-k hourglass network in the cascade hourglass network, a predicted loss value of the level-k hourglass network according to a sparse depth map in a $k^{th}$ type of resolution and a dense depth map in the $k^{th}$ type of resolution, the predicted loss value being used for representing a prediction error of predicting the dense depth map in the $k^{th}$ type of resolution by using the sparse depth map in the $k^{th}$ type of resolution, and k being a positive integer; calculate a predicted loss value of the cascade hourglass network according to weight parameter settings and the predicted loss value of the level-k hourglass network, the weight parameter settings referring to settings of weight parameters of predicted loss values of the n types of resolutions: and adjust a parameter of the cascade hourglass network according to the predicted loss value of the cascade hourglass network.

According to the technical solution provided in this embodiment of this application, a color map and a sparse depth map corresponding to a target scenario are obtained, then resolutions of the color map and the sparse depth map are adjusted to obtain color maps and sparse depth maps in multiple types of resolutions, and a cascade hourglass network is invoked to process the color maps and the sparse depth maps in the multiple types of resolutions to obtain prediction result maps in the multiple types of resolutions. A prediction result map in each resolution includes a dense depth map in the resolution. A computer device may generate, according to the dense depth maps in the multiple types of resolutions, a dense depth map corresponding to the target scenario, thereby providing a manner of generating a dense depth map by filling in pixels in a sparse depth map, that is, providing a depth completion manner.

In addition, an embodiment of this application further provides a method for training a cascade hourglass network: first calculating a loss value of each level of hourglass network in the cascade hourglass network, then calculating a loss value of the cascade hourglass network according to weight parameter settings and the loss value of each level of hourglass network, and then adjusting a parameter of the cascade hourglass network according to the loss value of the cascade hourglass network, so that in a case in which the loss value of the cascade hourglass network converges, training of the cascade hourglass network is completed. Compared with a case in which overall effect of a cascade hourglass network cannot be ensured to be optimal when each level of hourglass network in the cascade hourglass network is trained separately, in the technical solution provided in this embodiment of this application, the cascade hourglass network is trained as a whole, which can ensure an overall prediction effect of the cascade hourglass network, thereby ensuring accuracy of the dense depth map corresponding to the target scenario and outputted by the cascade hourglass network.

Figure 11:
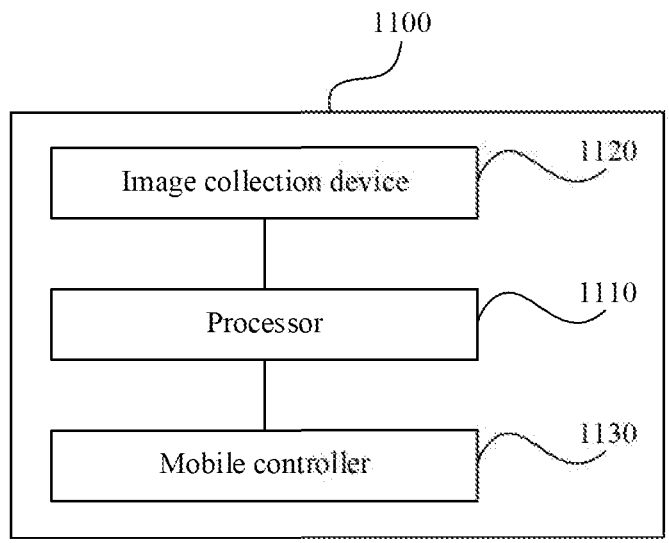
FIG. 11 is a structural block diagram of a mobile apparatus according to an embodiment of this application.

FIG. 11 is a structural block diagram of a mobile apparatus according to an embodiment of this application. The mobile apparatus has an example function of implementing the foregoing path planning method, and the function may be implemented by hardware, or may be implemented by hardware by executing corresponding software. The mobile apparatus includes a processor 1110, an image collection device 1120 and a mobile controller 1130 that are connected to the processor.

The image collection device 1120 is configured to acquire a color map and a sparse depth map of a target scenario.

The processor 1110 is configured to invoke a cascade hourglass network to process the color map and the sparse depth map to obtain a dense depth map corresponding to the target scenario: determine environment information of the target scenario according to the dense depth map, the environment information of the target scenario including feature information of a target object in the target scenario and a scenario structure of the target scenario; and determine a movement path of the mobile apparatus according to the environment information of the target scenario.

The mobile controller 1130 is configured to control the mobile apparatus to move according to the movement path.

In an example, the determining a movement path of the mobile apparatus according to the environment information of the target scenario includes: determining an obstacle in the target scenario according to the environment information of the target scenario: and determining the movement path according to the obstacle.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In conclusion, according to the technical solution provided in this embodiment of this application, the color map and the sparse depth map of the target scenario that are collected by the image collection device are acquired, then the cascade hourglass network is invoked to process the color map and the sparse depth map to obtain the dense depth map corresponding to the target scenario, then the environment information of the target scenario is determined according to the dense depth map, and the movement path of the mobile apparatus in the target scenario is determined according to the environment information, thereby providing a path planning method of the mobile apparatus. In addition, in a path planning process, after the color map and the sparse depth map of the target scenario that are collected by the image collection device are processed by using the cascade hourglass network to obtain the dense depth map, path planning is performed according to the dense depth map, and the dense depth map may reflect more environment information of the target scenario, so that a result of path planning can be more accurate.

Figure 12:
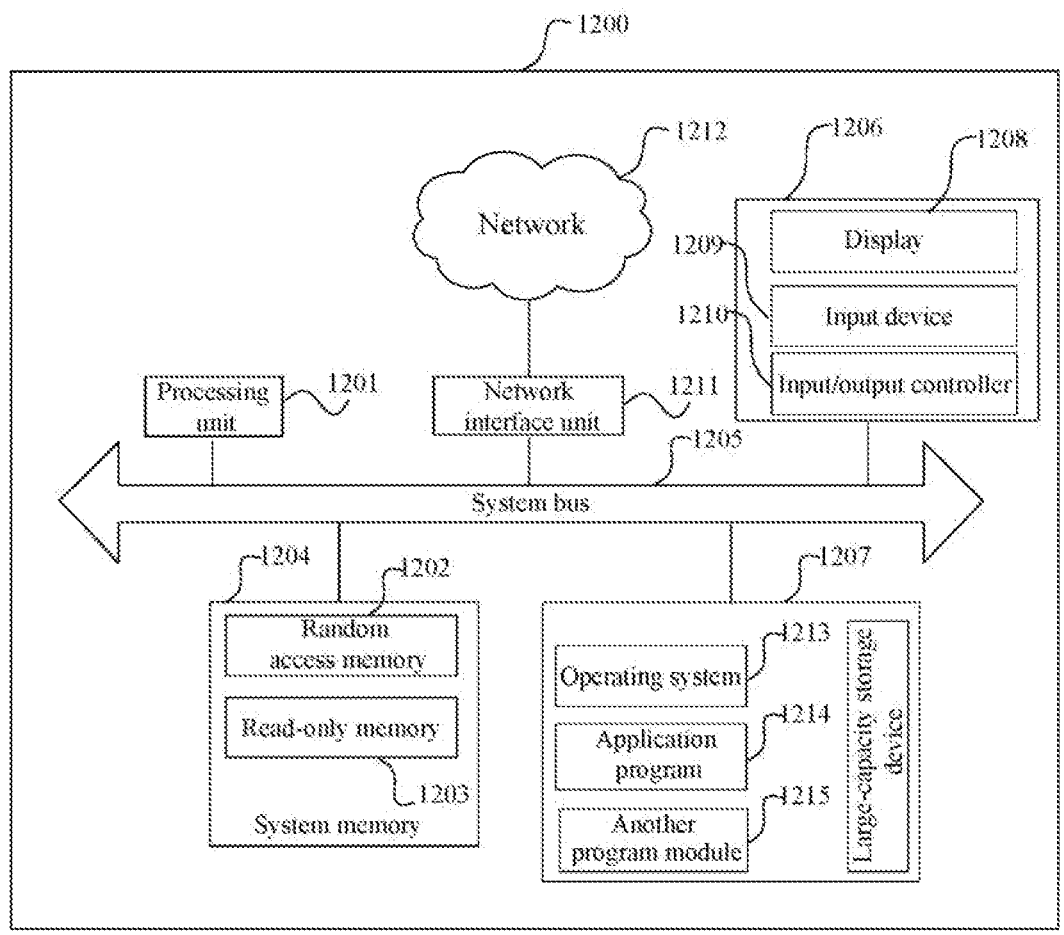
FIG. 12 is a structural block diagram of a computer device according to an embodiment of this application.

FIG. 12 is a structural block diagram of a computer device according to an embodiment of this application. The computer device may be configured to implement an example function of the foregoing image processing method or the foregoing path planning method.

Specifically, the computer device 1200 includes a processing unit (such as a central processing unit (CPU), a graphics processing unit (GPU), a field programmable gate array (FPGA)) 1201, a system memory 1204 that includes a random access memory (RAM) 1202 and a read-only memory (ROM) 1203, and a system bus 1205 connected to the system memory 1204 and the central processing unit 1201. The computer device 1200 further includes an input output system (I/O system) 1206 that assists in information transmission between components in the computer device, and a large-capacity storage device 1207 that is configured to store an operating system 1213, an application program 1214, and another program module 1215.

The basic I/O system 1206 includes a display 1208 configured to display information and an input device 1209, such as a mouse or a keyboard, configured to input information for a user. The display 1208 and the input device 1209 are both connected to the CPU 1201 by using an input and output controller 1210 connected to the system bus 1205. The basic I/O system 1206 may further include the input and output controller 1210 to be configured to receive and process inputs from multiple other devices such as a keyboard, a mouse, and an electronic stylus. Similarly, the input output controller 1210 further provides an output to a display screen, a printer or another type of output device.

The large-capacity storage device 1207 is connected to the CPU 1201 by using a large-capacity storage controller (not shown) connected to the system bus 1205. The mass storage device 1207 and an associated computer readable medium provide non-volatile storage for the computer device 1200. That is, the mass storage device 1207 may include a computer readable medium (not shown) such as a hard disk or a compact disc ROM (CD-ROM) drive.

Generally, the computer readable medium may include a computer storage medium and a communication medium. The computer storage medium includes volatile and nonvolatile media, and removable and non-removable media implemented by using any method or technology and configured to store information such as a computer readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, persons skilled in art can know that the computer storage medium is not limited to the foregoing several types. The system memory 1204 and the mass storage device 1207 may be collectively referred to as a memory.

According to the embodiments of this application, the computer device 1200 may further be connected, through a network such as the Internet, to a remote computer on the network. That is, the computer device 1200 may be connected to a network 1212 by using a network interface unit 1211 connected to the system bus 1205, or may be connected to another type of network or a remote computer system (not shown) by using a network interface unit 1211.

The memory further includes at least one instruction, at least one segment of program, a code set or an instruction set, the at least one instruction, the at least one segment of program, the code set or instruction set is stored in the memory, and is configured to be executed by one or more processors, so as to implement the foregoing image processing method or the foregoing path planning method.

In an exemplary embodiment, a non-transitory computer readable storage medium is further provided, where at least one instruction, at least one segment of program, a code set or an instruction set is stored in the storage medium, and the at least one instruction, the at least one segment of program, the code set or instruction set is loaded and executed by a processor to implement the foregoing image processing method or the foregoing path planning method.

In an example, the non-transitory computer readable storage medium may include: a read-only memory (ROM), a random access memory (RAM), a solid slate drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a non-transitory computer readable storage medium. The processor of the computer device reads the computer instructions from the computer readable storage medium, and the processor executes the computer instructions, so that the computer device executes the image processing method in any one of the foregoing embodiments or the foregoing path planning method.

It is to be understood that "plurality of" mentioned in the specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method of depth map completion, comprising:
   receiving, by processing circuitry of an information processing apparatus, a color map and a sparse depth map that are corresponding to a target scenario;
   adjusting, by the processing circuitry of the information processing apparatus, resolutions of the color map and the sparse depth map to generate n pairs of color maps and sparse depth maps of n different resolutions, each pair including one color map and one sparse depth map of a respective same resolution of the n different resolutions, n being a positive integer greater than 1;

processing, by the processing circuitry of the information processing apparatus, the n pairs of the color maps and the sparse depth maps to generate n prediction result maps using a cascade hourglass network including n levels of hourglass networks cascaded together, each of the n pairs being an input to a respective one of the n levels of the hourglass networks to generate the respective one of the n prediction result maps, the n prediction result maps each including a dense depth map of the same resolution as the corresponding pair; and generating, by the processing circuitry of the information processing apparatus, a final dense depth map corresponding to the target scenario according to the dense depth maps of the n prediction result maps, wherein each input to a first one of the n levels of hourglass networks consists of a first pair of a first color map and a first sparse depth map, the first pair is one of the n pairs of color maps and sparse depth maps, and each input to the first one of the n levels of hourglass networks is of a first resolution.

2. The method according to claim 1, wherein a current-level hourglass network in the cascade hourglass network is configured to process the prediction result map received from a previous-level hourglass network in the cascade hourglass network and the pair of the color map and the sparse depth map input to the current-level hourglass network, to obtain the prediction result map corresponding to the current-level hourglass network.

3. The method according to claim 1, wherein the processing comprises:

invoking an i-th level of the hourglass network in the n levels of hourglass networks to process an i-th pair of the color map and the sparse depth map of an i-th resolution in the n pairs to obtain an i-th prediction result map of the i-th resolution in the n prediction result map, i being a positive integer smaller than n;

converting the i-th resolution of the i-th prediction result map to an (i+1)-th resolution to obtain a converted prediction result map; and invoking an (i+1)-th hourglass network to process the converted prediction result map and an (i+1) the pair of the color map and the sparse depth map to obtain an (i+1)-th prediction result map.

4. The method according to claim 3, wherein the (i+1)-th hourglass network comprises an initial layer, a downsampling layer, an upsampling layer, and a prediction layer, and the invoking the (i+1)-th hourglass network comprises:

performing fusion processing on the converted prediction result map and the (i+1) the (i+1)-th pair of the color map and the sparse depth map by using the initial layer, to obtain a fused feature map;

performing downsampling on the fused feature map by using the downsampling layer to obtain a downsampled feature map;

performing upsampling on the downsampled feature map by using the upsampling layer to obtain a feature map of the (i+1)-th resolution; and predicting by using the prediction layer the (i+1)-th prediction result map based on the feature map of the (i+1)-th resolution.

5. The method according to claim 4, wherein one or more of the n prediction result maps each further comprise a feature guide map of the same resolution of the respective pair, the feature guide map being used for guiding filling of pixels in a sparse depth map; and the performing fusion processing comprises:

combining a feature guide map in the converted prediction result map and the color map of the (i+1)-th pair to obtain a first feature map;

combining the dense depth map in the converted prediction result map and the sparse depth map of the (i+1)-th pair to obtain a second feature map; and performing fusion processing on the first feature map and the second feature map by using the initial layer, to obtain the fused feature map, the fused feature map comprising a first feature map part and a second feature map part, and downsampling being separately performed on the first feature map part and the second feature map part in a case of passing through the downsampling layer.

6. The method according to claim 4, wherein the downsampling layer comprises a first downsampling layer and a second downsampling layer, and the upsampling layer comprises a first upsampling layer and a second upsampling layer, and the method further comprises:

combining an output of the first downsampling layer and an output of the second upsampling layer by using a residual connection, to obtain an input to the prediction layer; and combining an output of the second downsampling layer and an output of the first upsampling layer by using the residual connection, to obtain an input to the second upsampling layer.

7. The method according to claim 3, wherein the converting the i-th resolution of the i-th prediction result map comprises:

performing upsampling on the i-th prediction result map to obtain the converted prediction result map.

8. The method according to claim 1, wherein n is equal to 2, the n resolutions comprise the first resolution and a second resolution, the first resolution is different from the second resolution, and the cascade hourglass network comprises a level-1 hourglass network that is the first one of the n levels of hourglass networks and a level-2 hourglass network that are cascaded, and the processing comprises:

invoking the level-1 hourglass network to process the first pair of the first color map and the first sparse depth map to obtain a first prediction result map in the first resolution;

converting the resolution of the first prediction result map into the second resolution to obtain a converted prediction result map in the second resolution; and invoking the level-2 hourglass network to process the converted prediction result map and a second pair of the color map and the sparse depth map to obtain a second prediction result map in the second resolution.

9. The method according to claim 1, wherein the generating comprises:

converting resolutions of ones of the n dense depth maps in the n prediction result maps into a preset resolution to obtain a set of dense depth maps in the preset resolution; and combining the set of the dense depth maps in the preset resolution by using a residual connection, to obtain the final dense depth map corresponding to the target scenario.

10. The method according to claim 1, wherein a training process of the cascade hourglass network comprises:
 calculating, for a level-k hourglass network in the n levels of the hourglass networks, a predicted loss value of the level-k hourglass network according to a sparse depth map of a k-th resolution in the n different resolutions and a dense depth map of the k-th resolution, the predicted loss value being used for representing a prediction error of predicting the dense depth map of the k-th resolution by using the sparse depth map of the k-th resolution, and k being a positive integer smaller than or equal to n;
 calculating a predicted loss value of the cascade hourglass network according to weight parameters and predicted loss values of each of the n hourglass networks, the weight parameters each corresponding to one of the predicted loss values of the n hourglass networks; and
 adjusting parameters of the cascade hourglass network according to the predicted loss value of the cascade hourglass network.

11. An apparatus for information processing, comprising: processing circuitry configured to
 receive a color map and a sparse depth map that are corresponding to a target scenario;
 adjust resolutions of the color map and the sparse depth map to generate n pairs of color maps and sparse depth maps of n different resolutions, each pair including one color map and one sparse depth map of a respective same resolution of the n different resolutions, n being a positive integer greater than 1;
 process the n pairs of the color maps and the sparse depth maps to generate n prediction result maps using a cascade hourglass network including n levels of hourglass networks cascaded together, each of the n pairs being input to a respective one of the n levels of the hourglass networks to generate the respective one of the n prediction result maps, the n prediction result maps each including a dense depth map of the same resolution as the corresponding pair; and
 generate a final dense depth map corresponding to the target scenario according to the dense depth maps of the n prediction result maps, wherein
 each input to a first one of the n levels of hourglass networks consists of a first pair of a first color map and a first sparse depth map,
 the first pair is one of the n pairs of color maps and sparse depth maps, and
 each input to the first one of the n levels of hourglass networks is of a first resolution.

12. The apparatus according to claim 11, wherein a current-level hourglass network in the cascade hourglass network is configured to process the prediction result map received from a previous-level hourglass network in the cascade hourglass network and the pair of the color map and the sparse depth map input to the current-level hourglass network, to obtain the prediction result map corresponding to the current-level hourglass network.

13. The apparatus according to claim 11, wherein the processing circuitry is further configured to:
 invoke an i-th level of the hourglass network in the n levels of hourglass networks to process an i-th pair of the color map and the sparse depth map of an i-th resolution in the n pairs to obtain an i-th prediction result map of the i-th resolution in the n prediction result map, I being a positive integer smaller than n;
 convert the i-th resolution of the i-th prediction result map to an (i+1)-th resolution to obtain a converted prediction result map; and
 invoke an (i+1)-th hourglass network to process the converted prediction result map and an (i+1)-th pair of the color map and the sparse depth map to obtain an (i+1)-th prediction result map.

14. The apparatus according to claim 13, wherein the (i+1)-th hourglass network comprises an initial layer, a downsampling layer, an upsampling layer, and a prediction layer, and
 the processing circuitry is further configured to:
 perform fusion processing on the converted prediction result map and the (i+1)-th pair of the color map and the sparse depth map by using the initial layer, to obtain a fused feature map;
 perform downsampling on the fused feature map by using the downsampling layer to obtain a downsampled feature map;
 perform upsampling on the downsampled feature map by using the upsampling layer to obtain a feature map of the (i+1)-th resolution; and
 predict by using the prediction layer the (i+1)-th prediction result map based on the feature map of the (i+1)-th resolution.

15. The apparatus according to claim 14, wherein one or more of the n prediction result maps each further comprise a feature guide map of the same resolution of the respective pair, the feature guide map being used for guiding filling of pixels in a sparse depth map; and
 the processing circuitry is further configured to:
 combine a feature guide map in the converted prediction result map and the color map of the (i+1)-th pair to obtain a first feature map;
 combine the dense depth map in the converted prediction result map and the sparse depth map of the (i+1)-th pair to obtain a second feature map; and
 perform fusion processing on the first feature map and the second feature map by using the initial layer, to obtain the fused feature map, the fused feature map comprising a first feature map part and a second feature map part, and downsampling being separately performed on the first feature map part and the second feature map part in a case of passing through the downsampling layer.

16. The apparatus according to claim 14, wherein the downsampling layer comprises a first downsampling layer and a second downsampling layer, and the upsampling layer comprises a first upsampling layer and a second upsampling layer, and the processing circuitry is further configured to:
 combine an output of the first downsampling layer and an output of the second upsampling layer by using a residual connection, to obtain an input to the prediction layer; and
 combine an output of the second downsampling layer and an output of the first upsampling layer by using the residual connection, to obtain an input to the second upsampling layer.

17. The apparatus according to claim 13, wherein the processing circuitry is further configured to:
 perform upsampling on the i-th prediction result map to obtain the converted prediction result map.

18. The apparatus according to claim 11, wherein n is equal to 2, the n resolutions comprise the first resolution and a second resolution, the first resolution is different from the second resolution, and the cascade hourglass network comprises a level-1 hourglass network that is the first one of the n levels of hourglass networks and a level-2 hourglass network that are cascaded, and the processing circuitry is further configured to:
  invoke the level-1 hourglass network to process the first pair of the first color map and the first sparse depth map to obtain a first prediction result map in the first resolution;
  convert the resolution of the first prediction result map into the second resolution to obtain a converted prediction result map in the second resolution; and
  invoke the level-2 hourglass network to process the converted prediction result map and a second pair of the color map and the sparse depth map to obtain a second prediction result map in the second resolution.

19. The apparatus according to claim 11, wherein the processing circuitry is further configured to:
  convert resolutions of ones of the n dense depth maps in the n prediction result maps into a preset resolution to obtain a set of dense depth maps in the preset resolution; and
  combine the set of the dense depth maps in the preset resolution by using a residual connection, to obtain the final dense depth map corresponding to the target scenario.

20. A non-transitory computer-readable storage medium storing instructions, which when executed by at least one processor, cause the at least one processor to perform:
  receiving a color map and a sparse depth map that are corresponding to a target scenario;
  adjusting resolutions of the color map and the sparse depth map to generate n pairs of color maps and sparse depth maps of n different resolutions, each pair including one color map and one sparse depth map of a respective same resolution of the n different resolutions, n being a positive integer greater than 1;
  processing the n pairs of the color maps and the sparse depth maps to generate n prediction result maps using a cascade hourglass network including n levels of hourglass networks cascaded together, each of the n pairs being input to a respective one of the n levels of the hourglass networks to generate the respective one of the n prediction result maps, the n prediction result maps each including a dense depth map of the same resolution as the corresponding pair; and
  generating a final dense depth map corresponding to the target scenario according to the dense depth maps of the n prediction result maps, wherein
  each input to a first one of the n levels of hourglass networks consists of a first pair of a first color map and a first sparse depth map,
  the first pair is one of the n pairs of color maps and sparse depth maps, and
  each input to the first one of the n levels of hourglass networks is of a first resolution.

* * * * *